(12) United States Patent
Castañeda et al.

(10) Patent No.: US 12,313,853 B1
(45) Date of Patent: *May 27, 2025

(54) ADJUSTABLE FRAME ASSEMBLY AND AUGMENTED REALITY EYEWEAR WITH ADJUSTABLE FRAME ASSEMBLY

(71) Applicant: Snap Inc., Santa Monica, CA (US)

(72) Inventors: Julio Cesar Castañeda, Redondo Beach, CA (US); Mathias Hintermann, Los Angeles, CA (US); Kevin David Page, San Jose, CA (US); Samuel Bryson Thompson, Downers Grove, IL (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,912

(22) Filed: Jun. 7, 2023

Related U.S. Application Data

(63) Continuation of application No. 16/561,462, filed on Sep. 5, 2019, now Pat. No. 11,747,630.
(60) Provisional application No. 62/737,451, filed on Sep. 27, 2018.

(51) Int. Cl.
| | |
|---|---|
| *G02C 5/12* | (2006.01) |
| *A61F 9/02* | (2006.01) |
| *G02B 27/01* | (2006.01) |
| *G02C 7/02* | (2006.01) |
| *G06F 3/01* | (2006.01) |
| *G06V 20/20* | (2022.01) |

(52) U.S. Cl.
CPC ..... *G02B 27/0176* (2013.01); *G02B 27/0149* (2013.01); *G06F 3/013* (2013.01); *G06V 20/20* (2022.01); *G02B 2027/0158* (2013.01); *G02B 2027/0159* (2013.01); *G02B 2027/0178* (2013.01)

(58) Field of Classification Search
CPC .............. G02B 27/144; G02B 27/0172; G02B 27/0149; G02B 27/0103; A61B 3/103; A61B 3/1005; G02C 5/12; G02C 5/00; G02C 7/02; G02C 7/04
USPC ... 351/137, 41, 159.01, 159.73–159.77, 200, 351/205; 359/13–14, 629–632
See application file for complete search history.

(56) References Cited

U.S. PATENT DOCUMENTS

| | | |
|---|---|---|
| 6,667,833 B1 | 12/2003 | Fay |
| 11,747,630 B1 | 9/2023 | Castañeda et al. |
| 2002/0131015 A1 | 9/2002 | Caplan |
| 2006/0209430 A1 | 9/2006 | Spivey |
| 2011/0221656 A1 | 9/2011 | Haddick et al. |
| 2011/0228137 A1 | 9/2011 | Betensky et al. |
| 2015/0103306 A1 | 4/2015 | Kaji et al. |

(Continued)

*Primary Examiner* — Dawayne Pinkney
(74) *Attorney, Agent, or Firm* — CM Law; Stephen J. Weed

(57) ABSTRACT

An adjustable frame assembly for augmented reality eyewear. The frame assembly includes a face portion for supporting a first lens and a second lens, a support rest for supporting the face portion on a user, and at least one coupling for adjusting a position of at least one of the first lens and the second lens relative to the support rest. The frame assembly may further include at least one waveguide that creates an eye box in one of the first lens and the second lens. The at least one coupling enables movement of the eye box relative to the support rest to position the eye box in front of the wearer's eye.

20 Claims, 15 Drawing Sheets

(56) References Cited

U.S. PATENT DOCUMENTS

2019/0154952 A1 5/2019 Zheng et al.
2020/0310137 A1* 10/2020 Lan ..................... F16M 11/043

* cited by examiner

ADJUSTABLE FRAME ASSEMBLY AND AUGMENTED REALITY EYEWEAR WITH ADJUSTABLE FRAME ASSEMBLY

CROSS-REFERENCE TO RELATED APPLICATIONS

This application is a continuation of U.S. application Ser. No. 16/561,462, filed on Sep. 5, 2019, and claims priority to U.S. Provisional Application Ser. No. 62/737,451 entitled ADJUSTABLE FRAME ASSEMBLY AND AUGMENTED REALITY EYEWEAR WITH ADJUSTABLE FRAME ASSEMBLY, filed on Sep. 27, 2018, the contents of both applications being incorporated fully herein by reference.

FIELD

The present disclosure relates generally to augmented reality eyewear and, more particularly, to adjustable eyewear assemblies that can be customized for individual users.

BACKGROUND

Augmented reality (AR) is a live direct or indirect view of a physical, real-world environment whose elements are augmented (or supplemented) by computer-generated images such as video or graphics. FIG. 1 illustrates a conventional AR display system 100 incorporated into eyewear. In the conventional AR display system 100, a projector 102 projects light 104 containing an image into a waveguide 108 (e.g. lens 110). The light is projected toward an input coupler 106, which may be in the form of diffractive grating, that bends the light in order to trap the light within the waveguide 108. The light is internally reflected within the waveguide 108 until it encounters an output coupler 112, which also may be in the form of diffractive grating. Output coupler 112 causes the light to exit the wave guide 108.

Output coupler 112 creates a first portion of light 114 that exits lens 110 toward an eye of a user wearing the eyewear. Output coupler 112 also causes a second portion of light 116 to exit the opposite side of lens 110 away from the user's eye. The first portion of light 114 projects from lens 110 in the form of an image. To see the full image, a user's pupil needs to be positioned within an area called an "eye box" 170. The term "eye box", as used in the present disclosure, refers to an area in space within which a user's pupil must be positioned in order to see an image projected from the waveguide in front of that pupil.

The display performance of AR eyewear is impacted by different variables, including but not limited to the size and location of the eye box relative to the user's eye. Ideally, the output coupler should produce an eye box that is centered in front of the user's pupil so that the user's eye can sweep across the entire eye box and see the entire image. If the eye box is not properly positioned relative to the user's eye, the user will not see the full image.

The position of an eye box relative to the user's eye is dependent in part on how the eyewear is worn, and more particularly on how the lens is positioned relative to the user's eye. Display problems can arise if the eyewear does not fit the user properly, or if other factors are present that prevent the eye box from being properly positioned relative to the eye. Every user has their own unique physiological features that affect how eyewear fits, including but not limited to their head size, bone structure, facial contours, and relative positions of their eyes, ears and nose. Every user also has unique non-physiological factors that can influence how they wear eyewear, including individual preference for where eyewear sits on their head and face. For these reasons, a given set of eyewear will not fit every user the same. Therefore, the display performance of a given set of eyewear can vary greatly from user to user.

Some manufacturers of AR eyewear address this problem by configuring their eyewear to produce a large eye box relative to the size of the user's eye. The idea of providing a large eye box is based on the assumption that a large eye box will be more likely to overlap the optimum eye box position for a greater number of people, and therefore ensure better performance for more users. However, such a solution actually decreases performance for users in general, because a larger eye box sacrifices image quality. As the size of the eye box increases, the brightness and contrast of the resulting image decrease.

Other manufacturers of eyewear address the problem by offering multiple eyewear frames having different sizes. The idea of providing differently sized frames is based on the assumption that more frame sizes will result in more users finding a frame that correctly aligns the eye boxes with their eyes. However, there are many physiological and non-physiological variables that affect how eyewear fits, as noted above. Frames of different sizes only offer a limited number of solutions, making it unlikely that a user will find a size that compensates for every variable. Therefore, some users may find that their ideal frame size exists somewhere between the frame sizes that are available, preventing them from achieving an optimized eye box location.

BRIEF DESCRIPTION OF THE DRAWINGS

The present disclosure is best understood from the following detailed description when read in connection with the accompanying drawings. The various features of the drawings are not drawn to scale unless otherwise indicated. Included in the drawings are the following figures.

DETAILED DESCRIPTION

Numerous details are set forth in the following detailed description by way of examples in order to provide a thorough understanding of the relevant teachings. However, it should be apparent to those skilled in the art that the present teachings may be practiced without such details, or with the details featured in different arrangements and combinations.

The term "coupler" refers to any structure that facilitates or promotes the transition of light from one medium to another. When used in the context of a waveguide, couplers may be any structure created in, applied to, or otherwise formed on the waveguide which facilitates or promotes the input of light into the waveguide or the output of light from the waveguide. Couplers may be formed from the material of the waveguide, e.g., by molding or etching a surface of the waveguide to form facets, surfaces, or other structures which promote the input or output of light. Couplers may also be formed from materials or layers which are applied to a surface of the waveguide.

Figure 1:
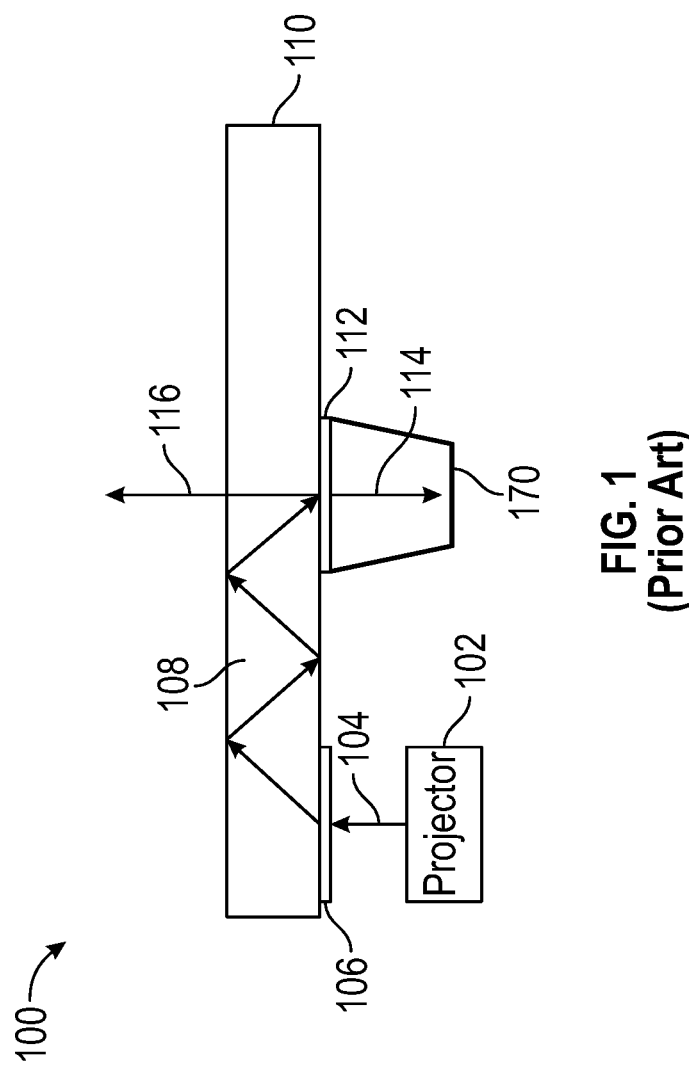
FIG. 1 is a block diagram of a conventional AR display system incorporated into eyewear.
Figure 2:
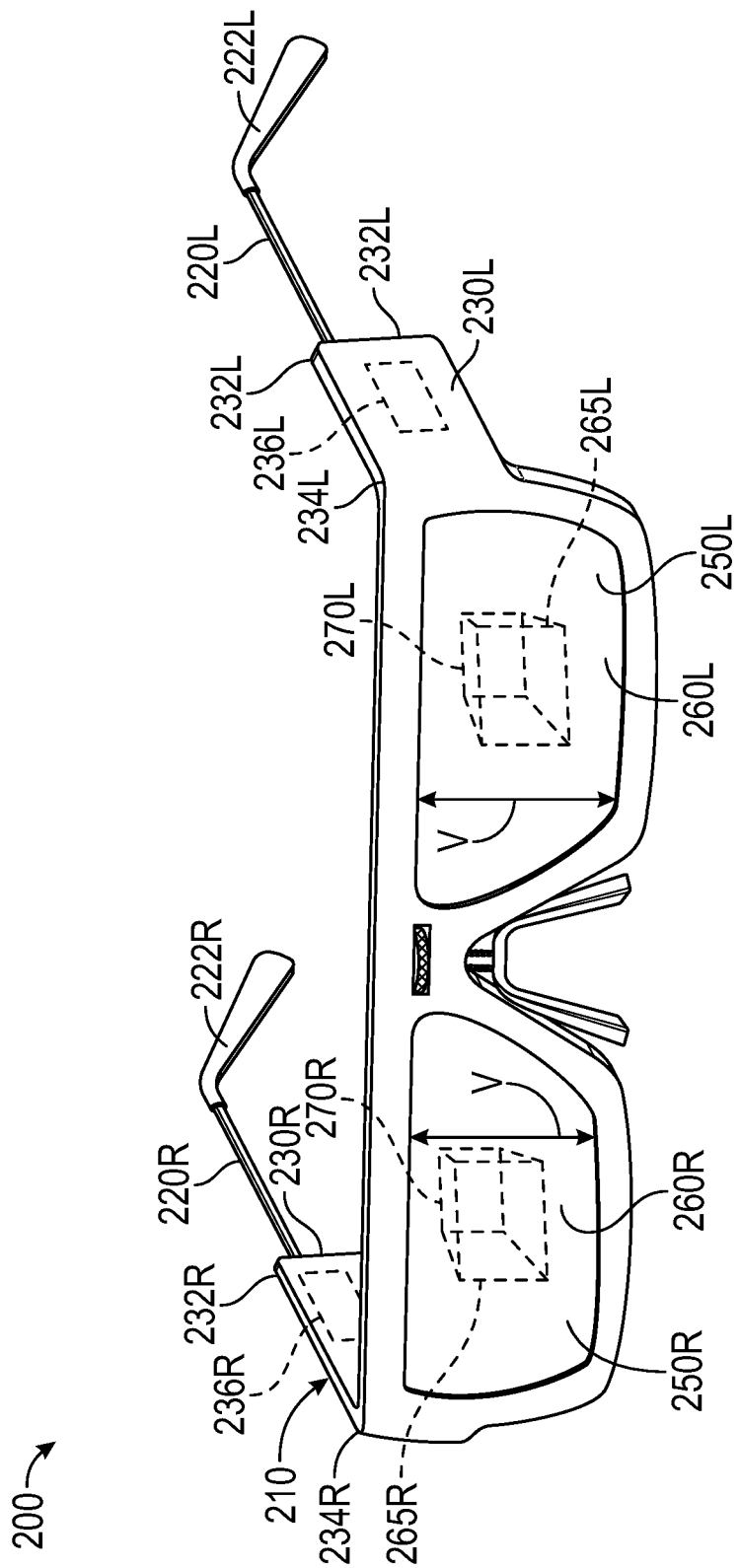
FIG. 2 is a perspective view of AR eyewear according to one example of the present disclosure.

FIG. 2 depicts one example of AR eyewear 200. Eyewear 200 includes an adjustable frame assembly 210 supporting a first waveguide 250L and a second waveguide 250R. First waveguide 250L includes a first lens 260L. First lens 260L has a first output coupler 265L for producing a first eye box 270L. Second waveguide 250R includes a second lens 260R. Second lens 260R has a second output coupler 265R for producing a second eye box 270R. Frame assembly 210 is operable to adjust and fine tune the vertical position of the first and second lenses 260L, 260R relative to the user's field of vision so as to optimize the vertical positions of first and second output couplers 265L, 265R, and consequently the vertical positions of eye boxes 270L, 270R. The term "vertical", as used in the present disclosure, refers to the up-down direction defined between a top edge of the frame assembly and the bottom edge of the frame assembly. The vertical direction in each lens 260L, 260R is depicted in FIG. 2 by the double-ended arrows labeled "V".

Frame assemblies according to the present disclosure can include various movable or fixed components for holding eyewear on the user's face. In the present example, frame assembly 210 includes a first temple or arm 220L and a second temple or arm 220R. First and second temples 220L, 220R include respective end pieces 222L, 222R that are curved to fit around the user's ears. Frame assembly also includes a first housing 230L and a second housing 230R. First housing 230L has a first end 232L fixedly attached to first temple 220L, and a second end 234L opposite first end 232L. Likewise, second housing 230R has a first end 232R fixedly attached to first temple 220R, and a second end 234R opposite first end 232R.

Figure 3:
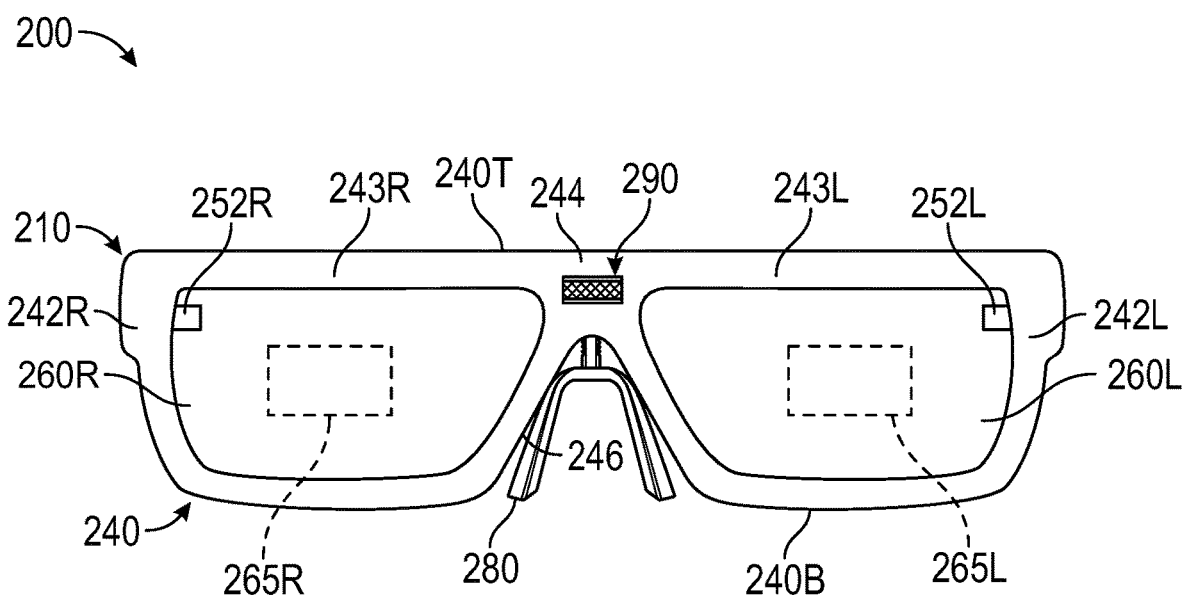
FIG. 3 is a front view of the AR eyewear according to FIG. 1.

FIG. 3 provides a front view of frame assembly 210. For clarity purposes, certain features shown in FIG. 2 are omitted in FIG. 3. Frame assembly 210 includes a face portion 240 that contains first lens 260L and second lens 260R. Face portion 240 includes a first end 242L and a second end 242R opposite first end 242L. First end 242L is fixedly attached to second end 234L of first housing 230L, and second end 242R is fixedly attached to second end 234R of second housing 230R. Face portion 240 defines a first rim 243L that houses first lens 260L, and a second rim 243R that houses second lens 260R. Face portion 240 also defines a centrally located bridge 244 that interconnects first rim 243L and second rim 243R.

Frame assemblies in accordance with the present disclosures can have a variety of configurations and components that allow the face portion to be supported on the user's nose. For example, various types of support rests can be used to support the face portion on the top of the user's nose. Support rests according to the present disclosure can have one or more elements that provide one or more points of contact on the wearer's face. In addition, support rests according to the present disclosure can have various degrees of flexibility, softness, padding and surface textures. For example, support rests according to the present disclosure can be formed of a soft material, including but not limited to soft silicone, or include one or more pads made of such a material.

In the present example, frame assembly 210 has a support rest in the form of a nose rest 280 having an inverted U-shaped body 282. Nose rest 280 is connected to bridge 244 and extends into a notch or recess 246 formed by first rim 243L, second rim 243R and bridge 244. In this position, nose rest 280 is configured to rest on top of the user's nose when eyewear 200 is placed on the user's face. As such, frame assembly 210 has three support points when it is worn as intended: (1) first temple 220L which rests on top of the user's left ear, (2) second temple 220R which rests on top of the user's right ear, and (3) nose rest 280 which rests on top of the user's nose.

Face portion 240 has a top edge 240T and a bottom edge 240B opposite the top edge. Bottom edge 240B extends along adjoining edges of first rim 243L, bridge 244, and second rim 243R. In this arrangement, bottom edge 240B borders recess 246 on three sides. Nose rest 280 connects to bridge 244 at bottom edge 240B by an adjustable coupling 290.

Figure 4:
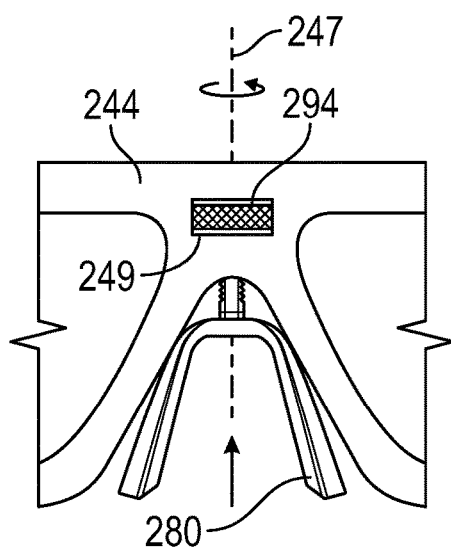
FIG. 4 is a truncated and magnified view of the AR eyewear according to FIG. 1, shown in a first operative state.
Figure 5:
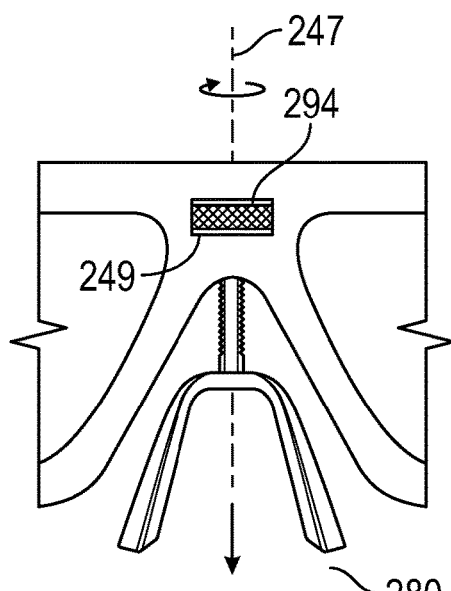
FIG. 5 is a truncated and magnified view of the AR eyewear according to FIG. 1, shown in a second operative state.

Adjustable coupling 290 is operable to adjust the relative position of nose rest 280 relative to face portion 240 of frame assembly 210. In particular, adjustable coupling 290 is operable to move nose rest 280 relative to face portion 240 in a first direction, which decreases the relative spacing between the nose rest and bridge 244, and a second direction, which increases the relative spacing between the nose rest and bridge. In this arrangement, nose rest 280 is movable relative to bridge 244 between a maximum raised position, shown in FIG. 4 and a maximum lowered position, shown in FIG. 5. By changing the relative spacing between nose rest 280 and bridge 244, the vertical positions of first and second output couplers 265L, 265R and their respective eye boxes 270L, 270R can be adjusted until the eye boxes are vertically centered relative to the user's pupils.

Figure 6:
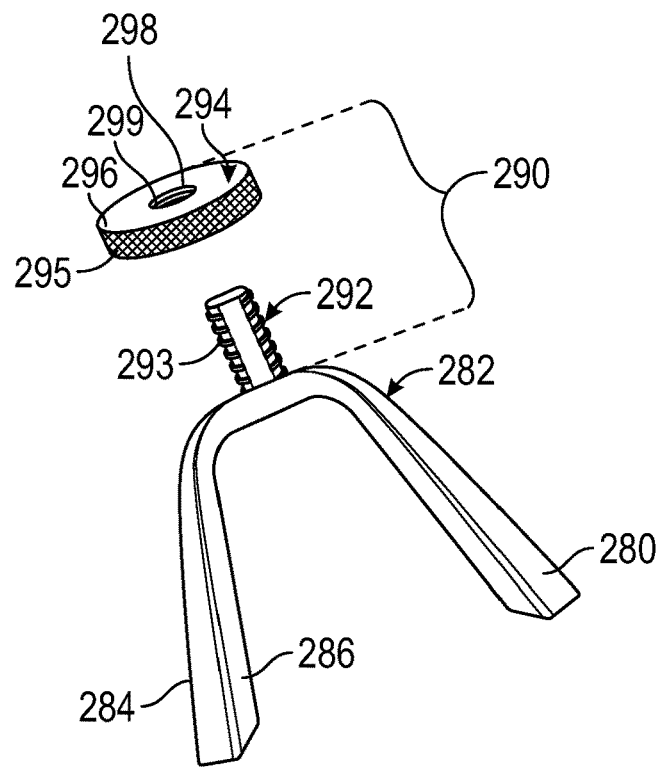
FIG. 6 is a magnified perspective view of components of the AR eyewear according to FIG. 1.
Figure 7:
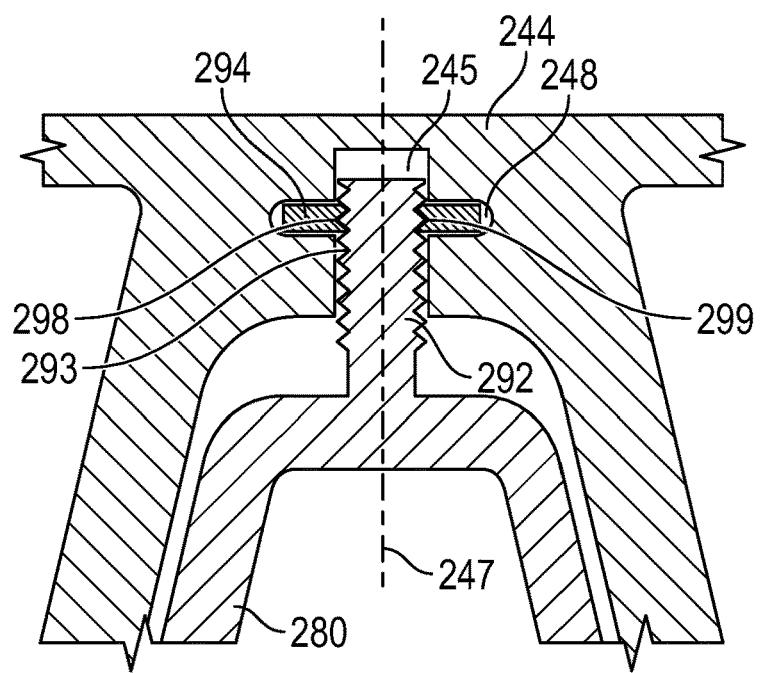
FIG. 7 is a truncated and magnified cross-section view of the AR eyewear according to FIG. 1, and the threaded engagement of the components of FIG. 6.

Frame assemblies and eyewear according to the present disclosure can include any type of adjustable coupling to adjust the vertical position of the face portion relative to the nose rest (or other type of support). Referring to FIGS. 6 and 7, adjustable coupling 290 includes a two part assembly featuring a threaded post 292 extending from nose rest 280 and a thumb wheel or dial 294. Threaded post 292 is generally rectangular in cross section, with two opposing sides each bearing a rounded contour and threads. Dial 294 has a ring shaped body 296 that defines a bore hole 298. Bore hole 298 has an internal thread 299. Bridge 244 defines a rectangular passage 245 defining a longitudinal axis 247 and a radially relieved section 248 along a midsection of the passage. Dial 294 is captively held in radially relieved section 248, with bore hole 298 axially aligned with longitudinal axis 247 of passage 245. In this arrangement, dial 294 can rotate in bridge 244 but remains axially fixed, while threaded post 292 can move axially in passage 245 but is fixed against rotation relative to the passage.

Threaded post 292 has an external thread 293 configured to mate with internal thread 299 of dial 294. As such, threaded post 292 can be advanced into passage 245 and threaded into bore hole 298 of dial 294. The threaded engagement between threaded post 292 and dial 294 allows the post to be axially displaced in passage 245 when the dial is rotated. Passage 245 is sufficiently long to receive most or all of the length of threaded post 292.

Radially relieved section 247 connects to the exterior of bridge 244 through opposing apertures 249, one aperture on the front of face portion 240 and the other aperture on the rear of the face portion. A portion of dial 294 projects through each aperture 249 where the portion is exposed on the exterior of bridge 244. With this arrangement, a user can rotate dial 294 with his or her fingers and/or thumb. Rotation of dial 294 will axially displace threaded post 292 within passage 245 and move face portion 240 relative to nose rest 280.

When frame assembly 210 is worn by a user, with nose rest 280 resting on the user's nose, movement of face portion 240 toward the nose rest has the effect of the moving bottom edge 240B closer to the user's nose. This direction of movement of face portion 240 will be referred to as "down" or the "downward direction." Conversely, when frame assembly 210 is worn by the user, with nose rest 280 resting on the user's nose, movement of face portion 240 away from the nose rest has the effect of moving bottom edge 240B away from the user's nose. This direction of movement of face portion 240 will be referred to as "up" or the "upward direction."

Dial 294 is rotatable in a first direction to move face portion 240 in the downward direction, and a second direction opposite the first direction to move the face portion in the upward direction. Dials according to the present disclosure can have ridges, knurling or other surface features that help the user's finger tips grip the dial and reduce finger slippage. In the present example, dial 294 has a plurality of ribs 295 extending around the outer surface of the dial to make the surface easier to grip and rotate.

Eyewear according to the present disclosure can each be provided with a set of nose rests, each nose rest having a body with a unique shape and fit. Each of the nose rests can be configured for attachment to the face portion by inserting the threaded post into the passage and rotating the dial in a first direction to draw the threaded post into the bridge. Each nose rest can also be removed from the face portion by rotating the dial in a second direction opposite the first direction until the threaded post completely exits the bridge, at which time, the nose rest can be replaced with a different nose rest in the set. This allows users to try different nose rests and choose a nose rest that feels comfortable on their nose.

Nose rests according to the present disclosure can also include an asymmetrical body design that features a front side and a rear side having a different contour than the front side. This provides each nose rest with two different surface profiles, one on the front side and the other on the rear side, with each surface profile configured to rest on the user's nose differently. Referring to FIG. 6, for example, nose rest 280 has a first side 284 with a first profile and a second side 286 opposite the first side with a second profile different from the first profile. This asymmetry allows the user to utilize nose rest 280 in a first orientation with the first side 284 contacting their nose, or in a second orientation with the second side 286 contacting their nose. If the user finds that the first side 284 is uncomfortable against their nose, then the user can remove nose rest 280 from face portion 240, rotate the nose rest 180 degrees, and reinsert the nose rest into the face portion with the second side 286 against their nose.

Eyewear according to the present disclosure can feature either conventional or customized components for projecting light images through the lenses. Referring back to FIGS. 2 and 3, first housing 230L contains a first projector 236L, and second housing 230R contains a second projector 236R. First projector 236L is operable to project light containing an image toward an input coupler 252L in first lens 260L. Similarly, second projector 236R is operable to project light containing an image toward an input coupler 252R in second lens 260R. First and second input couplers 252L, 252R bend light to trap the light within first and second waveguides 260L, 260R, respectively. Light is internally reflected within first and second waveguides 260L, 260R until the light encounters output couplers 265L, 265R, causing the light to exit lenses 260L, 260R. A portion of the exiting light is directed toward the user's eyes and visible in eye boxes 270L, 270R.

Eyewear and frame assemblies according to the present disclosure can be placed on a user's head in the same manner as conventional eyeglasses. In the present example, a user can place eyewear 200 on his/her head by placing first temple 220L over their left ear and placing right temple 220R over their right ear. The user then lowers first temple 220L and second temple 220R onto the left ear and right ear, respectively, until the first and second temples rest on top of each ear behind the helix. Portions of end pieces 222L, 222R may also rest on top of the ear and/or extend around the ear behind the helix. Face portion 240 is lowered onto the user's nose until nose rest 280 rests on top of the nose, with first lens 260L in front of the left eye and second lens 260R in front of the right eye. In this arrangement, eyewear 200 is supported in a stable position on the user's left ear, right ear and nose.

Eyewear 200 is powered on in a conventional manner to activate first and second projectors 236L, 236R and produce images in first and second eye boxes 270L, 270R. The user's bone structure, facial features, or other physiological or non-physiological factors can initially cause first and second eye boxes 270L, 270R to be positioned too high or too low relative to the user's pupils. In such a case, the relative positions of first and second eye boxes 270L, 270R can be fine-tuned using adjustable coupling 290 until each eye box is positioned at the optimum vertical position for the user.

For example, if each eye box 270L, 270R is positioned too high relative to the user's eye, the user can fine tune the position of each eye box by rotating dial 294 in the first direction. This action will move face portion 240 down, and consequently move output couplers 265L, 265R and their respective eye boxes 270L, 270R down. Conversely, if each eye box 270L, 270R is positioned too low relative to the user's eye, the user can fine tune the position of each eye box by rotating dial 294 in the second direction opposite the first direction. This action will move face portion 240 up, and consequently move output couplers 265L, 265R and their respective eye boxes 270L, 270R up. Depending on whether eye boxes 270L, 270R are too high or too low, the user rotates the dial in the first direction or second direction until the user can see the full images in the eye boxes.

Figure 8:
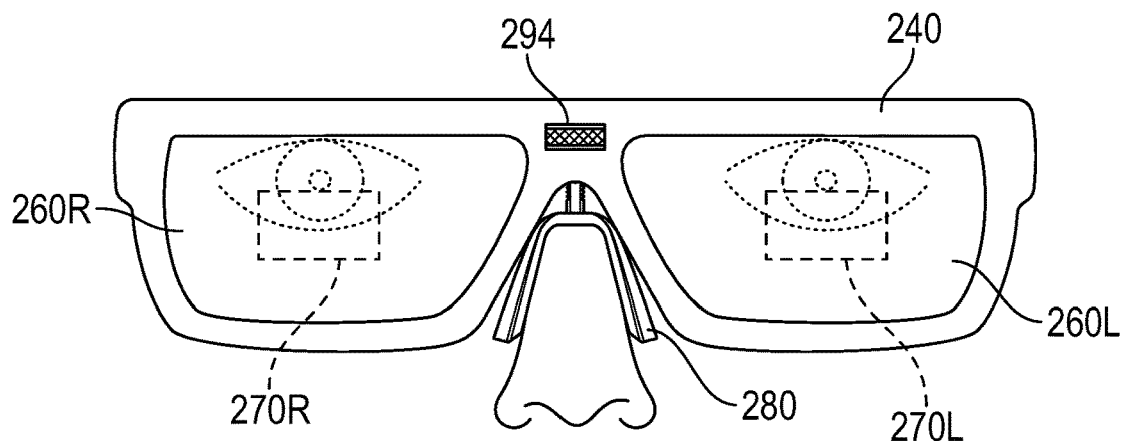
FIG. 8 is a front view of the AR eyewear according to FIG. 1, being worn by a user in a first position prior to adjustment.
Figure 9:
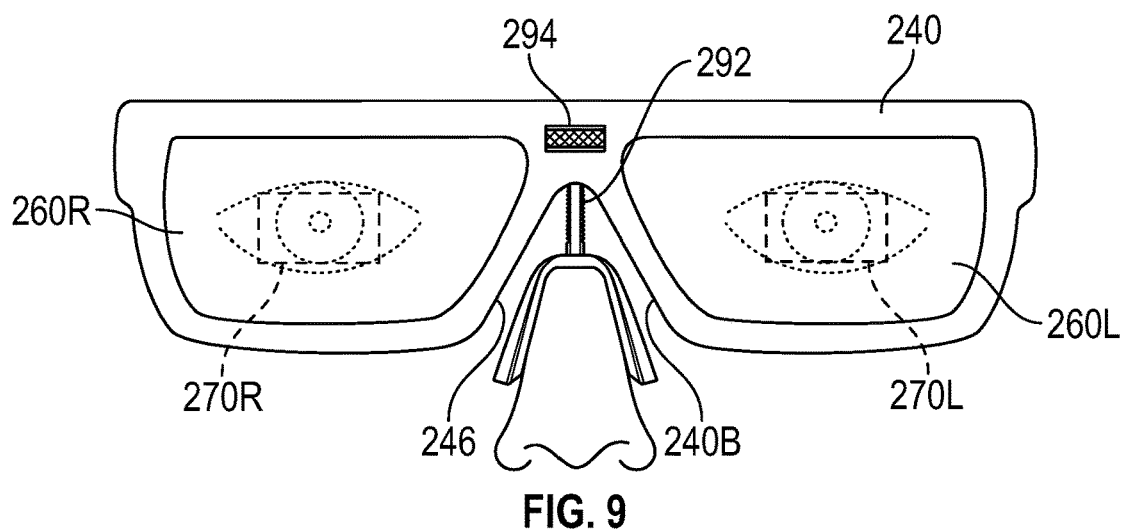
FIG. 9 is a front view of the AR eyewear according to FIG. 1, being worn by a user in a second position after adjustment.

FIGS. 8 and 9 illustrate the relative positions of face portion 240 and eye boxes 270L, 270R before and after adjustment. Some features of eyewear 200, such as output couplers 265L, 265R, are omitted for clarity.

FIG. 8 depicts a scenario in which eyewear 200 is placed on the user's face without any adjustment. The projectors 236L, 236R are powered on to produce images in first and second eye boxes 270L, 270R. In this scenario, first and second eye boxes 270L, 270R are beneath the user's pupils. Therefore, the user will not be able to see complete images. This is due to the relative positions of lenses 260L, 260R and eye boxes 270L, 270R, which are positioned too low relative to the user's pupils.

To correct this condition, the user can rotate dial 294 to move frame portion 240 up until eye boxes 270L, 270R are aligned with the user's pupils. FIG. 7 shows the same eyewear 200 on the same user after face portion 240 has been adjusted using adjustment coupling 290. As can be seen, face portion 240 and eye boxes 270L, 270R have moved upwardly with respect to nose rest 280. In this adjusted position, first and second eye boxes 270L, 270R are vertically centered in optimized positions in front of the user's pupils so that the user can see the full image in each eye box.

The thread pitches of external thread 293 and internal thread 299 are preferably small so that each 360 degree revolution of dial 294 only moves first and second eye boxes 270L, 270R a small distance up or down. For example, the thread pitch can be in the range of 0.3 mm-1.0 mm. Other thread pitches can also be used with suitable results. A small thread pitch permits very fine adjustment of the vertical position of eye boxes, and also prevents significant changes in vertical position when dial 294 is inadvertently bumped or touched, such as when the user takes the eyewear off or when the eyewear is being handled.

The threaded engagement between nose rest 280 and bridge 244 has the advantage of providing continual vertical adjustment of first and second eye boxes 270L, 270R. First and second eye boxes 270L, 270R can be vertically adjusted through an infinite number of vertical positions, allowing each user to achieve a customized fit that provides optimized vertical positioning of the eye boxes. The ability to optimize the vertical positions of eye boxes 270L, 270R avoids the need to design and manufacture multiple different frame sizes. The ability to optimize the vertical positions of eye boxes 270L, 270R also avoids the need to provide large eye boxes to accommodate different users. In fact, the sizes of eye boxes and output couplers can be reduced because the ability to fine tune the vertical positions of eye boxes makes it possible to align a much smaller eye box to any eye. It has been found that an output coupler that is 14 mm wide×9 mm high can be reduced to a size of 14 mm wide×4 mm high when vertical adjustment is provided. This reduction reduces the height of each eye box by 5 mm, resulting in an overall size reduction of approximately 55.6% for each eye box. Although each eye box is much smaller in the vertical direction, the eyewear still accommodates many different users because the smaller eye boxes can be vertically centered relative to the user's pupils.

Figure 10:
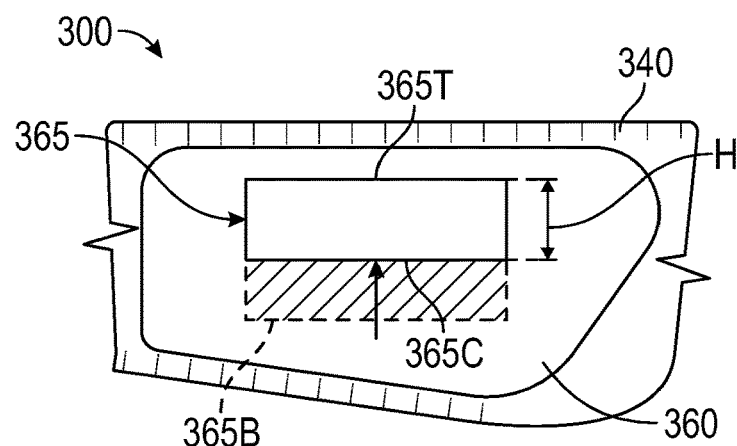
FIG. 10 is a truncated and magnified front view of a lens portion of eyewear according to another example of the present disclosure.

FIG. 10 schematically illustrates how eye box size can be reduced in eyewear 300 according to the present disclosure. Eyewear 300 has a face portion 340 containing a lens 360. Lens 360 includes a rectangular output coupler 365 with a top edge 365T. If eyewear 300 does not have an adjustment mechanism for adjusting the vertical position of face portion 340, then a larger output coupler will be required to produce a sufficiently large eye box that accommodates different users. A larger output coupler is depicted in FIG. 10 with its bottom edge 365B shown by a dashed line.

If eyewear 300 is equipped with an adjustment coupling (e.g. adjustment coupling 290), then the height of output coupler 365 does not need to be as large. Therefore, the bottom edge of output coupler 365 can be moved closer to top edge 365T, as shown by the arrow and solid line 365C which represents the bottom edge of the smaller eye box. Moving the bottom edge closer to top edge 365T results in an output coupler and eye box with a smaller height H. The cross hatched area represents the portion of output coupler that is eliminated.

As noted above, the brightness and contrast of images degrade as the size of eye boxes increase. Therefore, brightness and contrast can improve by decreasing the vertical dimension of each eye box. The inventors have observed a 30% improvement in brightness in each eye box when the size of each eye box size is decreased from 14 mm wide×9 mm high to 14 mm wide×4 mm high. In view of the improved image quality, the required light intensity to produce an image of good quality is decreased. Therefore, the amount of input power required to produce a quality image is also decreased, resulting in less power consumption and longer battery life.

Frame assemblies and eyewear according to the present disclosure can include a variety of adjustable couplings to adjust the vertical position of the face portion, as noted above. Therefore, the adjustable couplings are not limited to threaded posts and dials, and include other mechanisms that permit vertical adjustment of the face portion. For example, alternative eyewear according to the present disclosure can be identical in all respects to eyewear 200, except that the adjustable coupling features a ratchet and pawl to adjust the position of the bridge relative to nose rest. The pawl can be housed inside the bridge, and the ratchet can engage the pawl inside the bridge. This arrangement allows the adjustment coupling to be partially or completely concealed inside the bridge, thereby providing a more aesthetic appearance to the frame.

Eyewear and frame assemblies according to the present disclosure can also include mechanisms that allow users to adjust and fine tune the horizontal positions of eye boxes. Mechanisms for adjusting the horizontal position of an eye box according to the present disclosure work independently of mechanisms for adjusting the vertical position. Therefore, eyewear according to the present disclosure can include a horizontal adjustment mechanism in combination with a vertical adjustment mechanism, allowing the user to optimize both the horizontal and vertical position of an eye box. Alternatively, eyewear according to the present disclosure can feature only a horizontal adjustment mechanism, or feature only a vertical adjustment mechanism.

Figure 11:
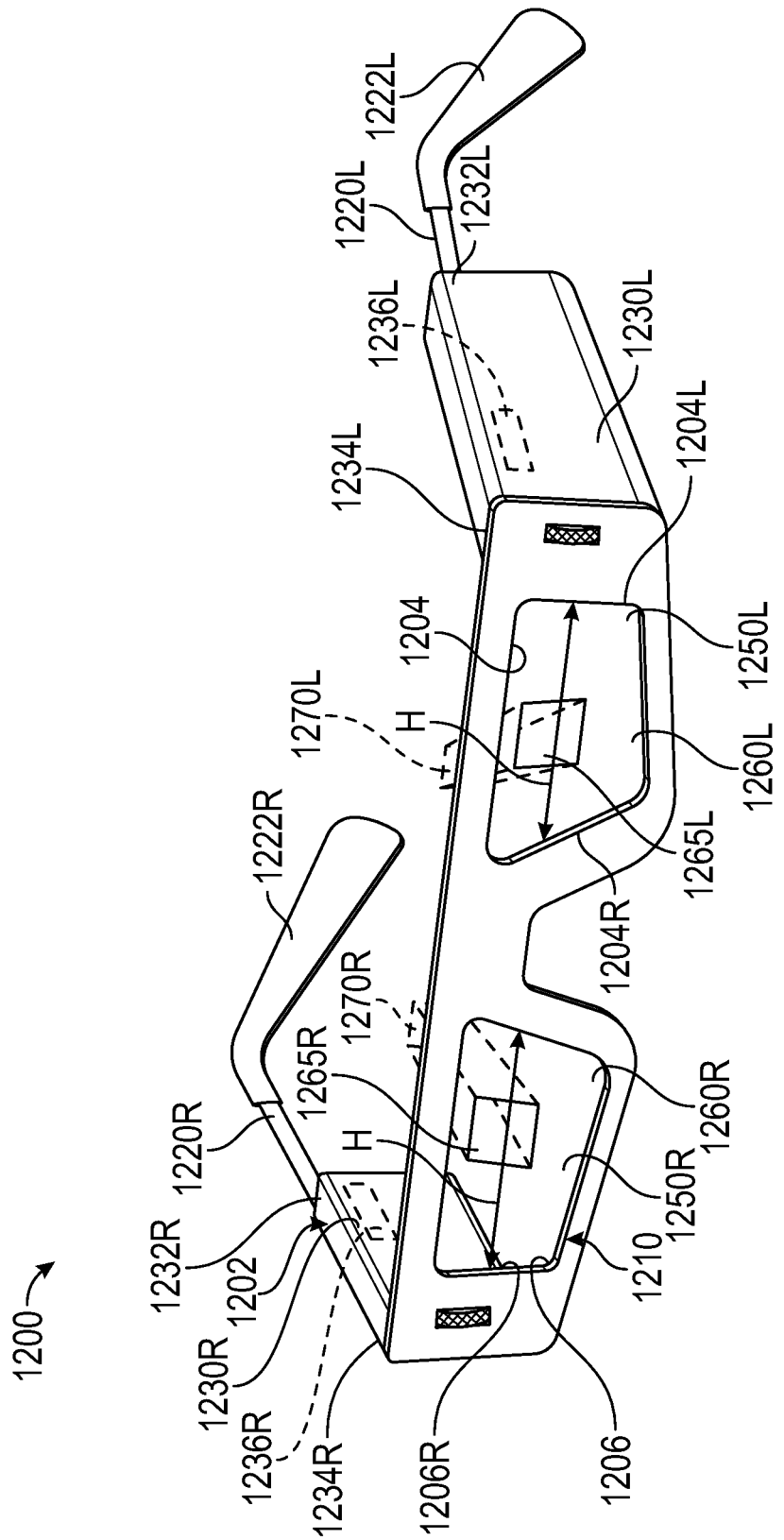
FIG. 11 is a perspective view of AR eyewear according to another example of the present disclosure.

FIG. 11 depicts one example of AR eyewear 1200 that includes only a horizontal adjustment feature. Eyewear 1200 includes a frame 1202 that defines a first socket 1204 and a second socket 1206. First socket 1204 supports a first waveguide 1250L in a movable arrangement, as will be described. In addition, first socket 1204 has a first or "left" side 1204L and a second or "right" side 1204R opposite the left side. Frame 1202 also defines a second socket 1206 that supports a second waveguide 1250R in a movable arrangement, as will be described. Second socket 1206 has a first or "left" side 1206L and a second or "right" side 1206R opposite the left side, analogous to first socket 1204.

First waveguide 1250L is in the form of a first lens 1260L. First lens 1260L has a first output coupler 1265L for producing a first eye box 1270L. Second waveguide 1250R is in the form of a second lens 1260R. Second lens 1260R has a second output coupler 1265R for producing a second eye box 1270R. Eyewear 1200 also includes a horizontal adjustment assembly 1290, which is operable to adjust and fine tune the horizontal positions of first and second lenses 1260L, 1260R relative to the user's field of vision. Horizontal adjustment assembly 1290 allows a user to optimize the horizontal positions of first and second output couplers 1265L, 1265R, and consequently the horizontal positions of eye boxes 1270L, 1270R relative to each eye.

The term "horizontal", as used in the present disclosure, refers to the left-right direction extending between left side 1204L and right side 1204R of first socket 1204, and the left-right direction extending between left side 1206L and right side 1206R of second socket 1206. The horizontal direction in each of sockets 1204, 1206 is identified by the double-ended arrows labeled "H" in FIG. 11.

Frame 1202 includes a first temple or arm 1220L and a second temple or arm 1220R. First and second temples 1220L, 1220R include respective end pieces 1222L, 1222R that are curved to fit around the user's ears. Frame 1202 also includes a first housing 1230L and a second housing 1230R. First housing 1230L has a first end 1232L fixedly attached to first temple 1220L, and a second end 1234L opposite first end 1232L. Likewise, second housing 1230R has a first end 1232R fixedly attached to first temple 1220R, and a second end 1234R opposite first end 1232R.

Figure 12:
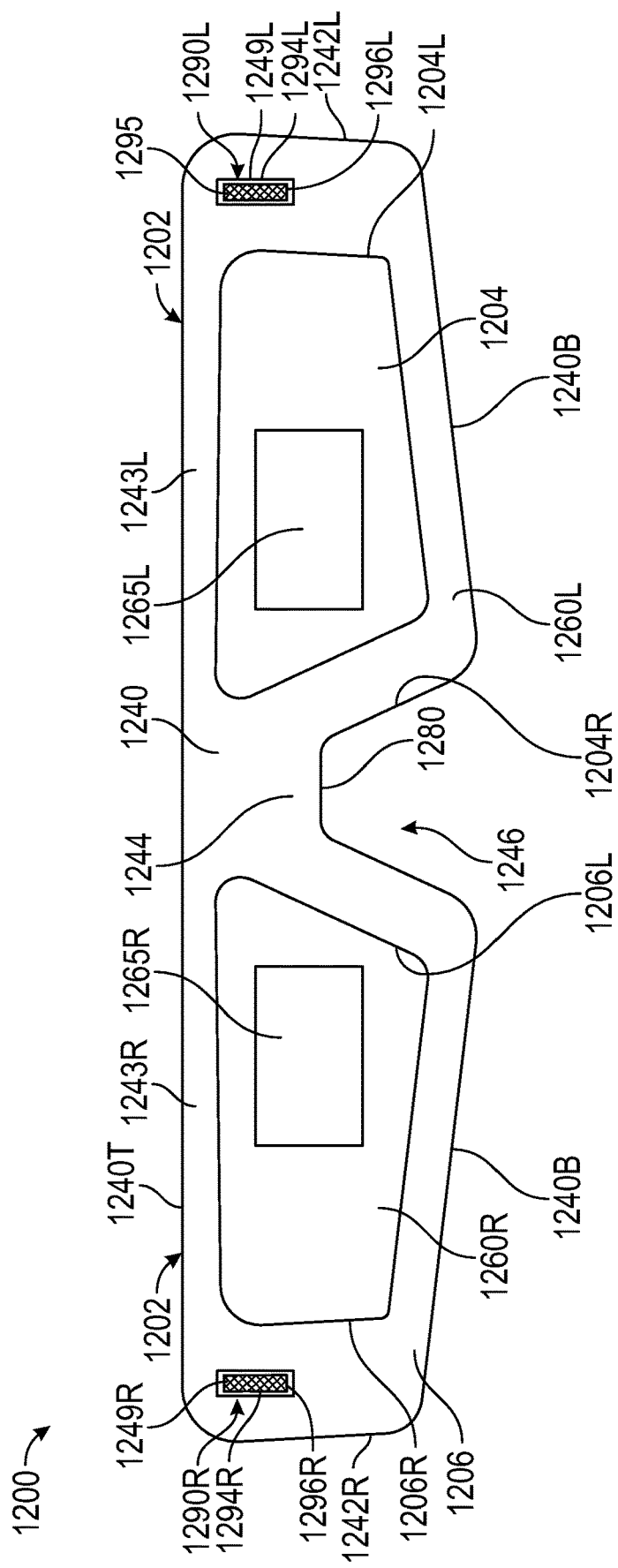
FIG. 12 is a front view of the AR eyewear according to FIG. 11.

Referring to FIG. 12, frame 1202 further includes a face portion 1240 that contains first lens 1260L and second lens 1260R. Face portion 1240 includes a first end 1242L and a second end 1242R opposite first end 1242L. First end 1242L is fixedly attached to second end 1234L of first housing 1230L, and second end 1242R is fixedly attached to second end 1234R of second housing 1230R. Face portion 1240 defines a first rim 1243L that houses first lens 1260L, and a second rim 1243R that houses second lens 1260R. Face portion 1240 also defines a centrally located bridge 1244 that interconnects first rim 1243L and second rim 1243R.

As noted above, frames according to the present disclosure can have a variety of configurations and components that allow the face portion to be supported on the user's head and face. For example, various types of support rests can be used to support the face portion on the top of the user's nose. In the present example, lower edges of first rim 1243L, second rim 1243R and bridge 1244 form a nose rest 1280 that supports frame 1202 on the user's nose. First rim 1243L, second rim 1243R and bridge 1244 border a notch or recess 1246 which accommodates the user's nose. In this arrangement, frame 1202 has three support points when it is worn as intended: (1) first temple 1220L which rests on top of the user's left ear, (2) second temple 1220R which rests on top of the user's right ear, and (3) nose rest 1280 which rests on top of the user's nose.

Face portion 1240 has a top edge 1240T and a bottom edge 1240B opposite the top edge. Bottom edge 1240B extends along adjoining edges of first rim 1243L, bridge 1244, and second rim 1243R. In this arrangement, bottom edge 1240B borders recess 246 on three sides.

Horizontal adjustment assembly 1290 is operable to adjust the horizontal positions of each waveguide 1250L, 1250R relative to frame 1202. In particular, horizontal adjustment assembly 1290 is operable to move waveguide 1250L in the horizontal direction relative to first rim 1243L and move waveguide 1250R in the horizontal direction relative to second rim 1243R. In this arrangement, horizontal adjustment assembly 1290 is operable to move first waveguide 1250L toward left side 1204L of first socket 1204 or move the first waveguide toward right side 1204R of the first socket. Likewise, horizontal adjustment assembly 1290 is operable to move second waveguide 1250R horizontally toward left side 1206L of second socket 1206 or move the second waveguide horizontally toward right side 1206R of the second socket. This has the effect of moving first and second output couplers 1265L, 1265R and the corresponding eye boxes 1270L, 1270R in the horizontal direction relative to frame 1202.

Figure 13:
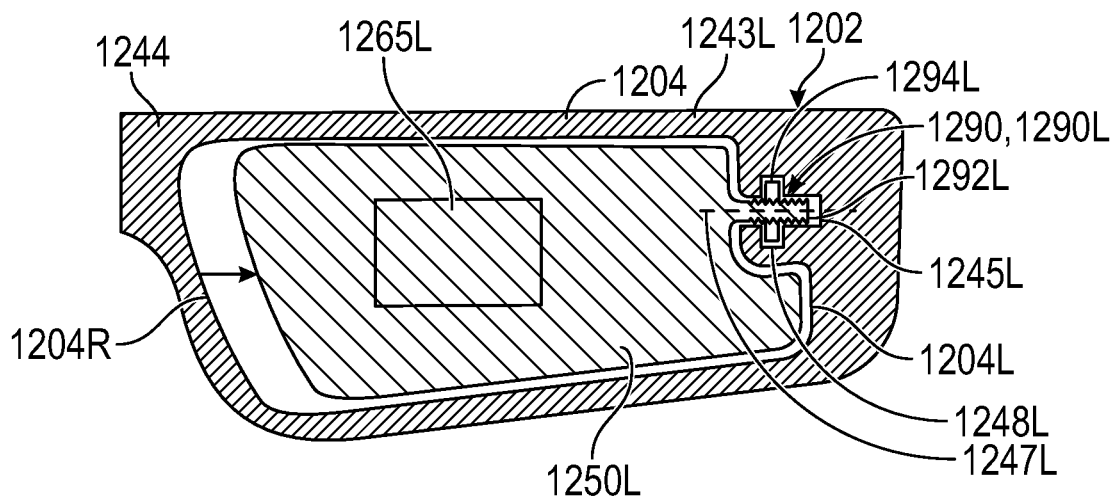
FIG. 13 is a truncated and magnified view of the AR eyewear according to FIG. 11, shown in a first operative state.
Figure 14:
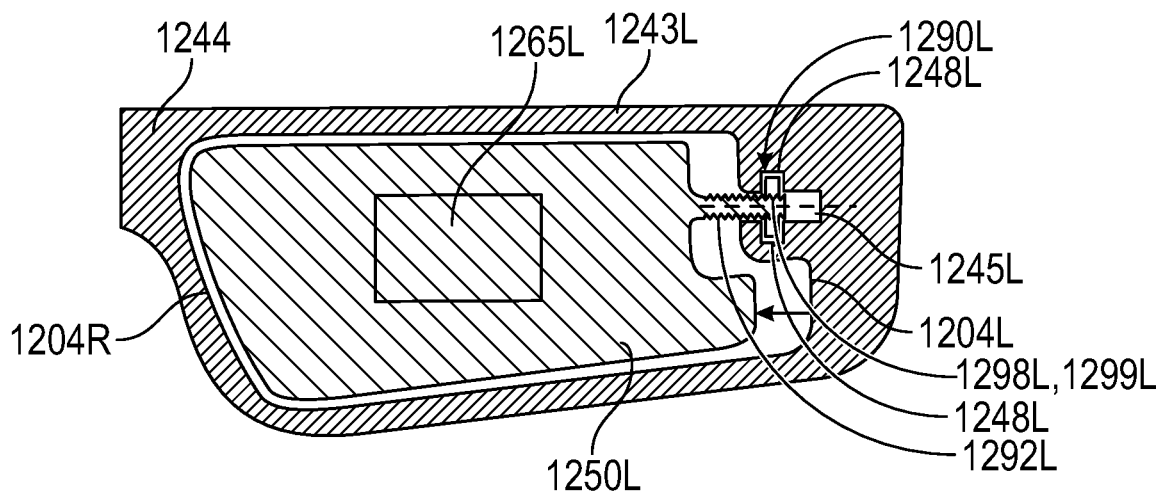
FIG. 14 is a truncated and magnified view of the AR eyewear according to FIG. 11, shown in a second operative state.

First waveguide 1265L is movable inside first socket 1204 between a leftmost position, shown in FIG. 13, and a rightmost position, shown in FIG. 14. Second waveguide 1265R is moveable to a rightmost position and a leftmost position that are mirror images of the positions shown in FIGS. 13 and 14, respectively. By changing the relative horizontal position of each waveguide, 1265L, 1265R, the relative position of each eye box 1270L, 1270R can be adjusted until the eye boxes are horizontally centered with respect to the user's pupils.

Frame assemblies and eyewear according to the present disclosure can include any type of adjustable coupling to adjust the horizontal position of a waveguide relative to the frame. Options include a threaded post/thumb wheel combination or a ratchet/pawl arrangement, similar to adjustable couplings 290, 290'. In the present example, horizontal adjustment assembly 1290 includes a first adjustment coupling 1290L that controls the horizontal position of first waveguide 1265L, and a second adjustment coupling 1290R that controls the horizontal position of second waveguide 1265R. First and second waveguides 1265L, 1265R and their respective adjustment couplings 1290L, 1290R are arranged in a mirrored arrangement.

Figure 15:
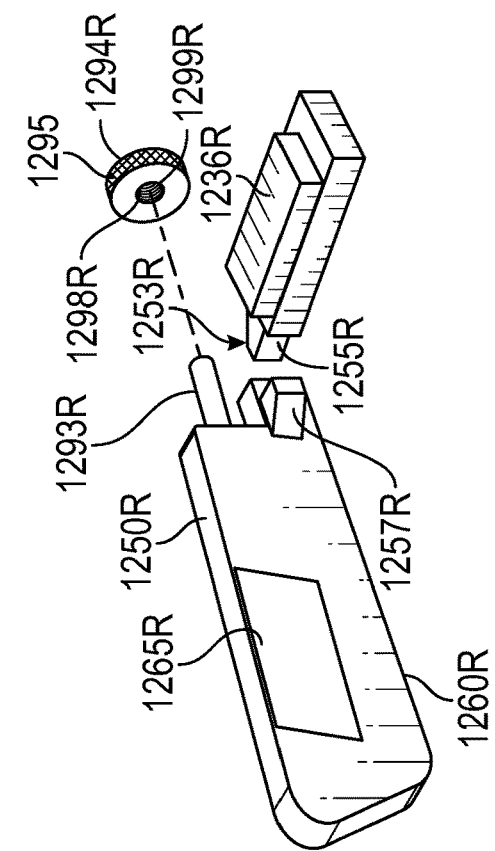
FIG. 15 is an exploded perspective view of components of the AR eyewear according to FIG. 11.
Figure 15:
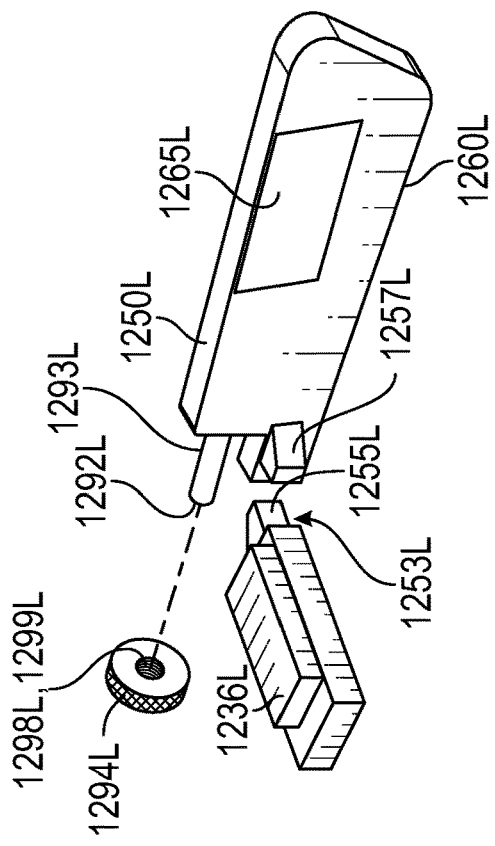

Referring to FIGS. 13-15, first adjustment coupling 1290L includes a threaded post 1292L extending from first waveguide 1265L and a thumb wheel or dial 1294L. Similarly, second adjustment coupling 1290R includes a threaded post 1292R extending from second waveguide 1265R and a thumb wheel or dial 1294R. Dials 1294L, 1294R have ring shaped bodies 1296L, 1296R that define bore holes 1298L, 1298R, respectively. Bore holes 1298L, 1298R have internal threads 1299L, 1299R. Face portion 1240 forms a first passage 1245L defining a longitudinal axis 1247L and a radially relieved section 1248L along a midsection of the passage. Face portion 1240 also forms a second passage 1245R defining a longitudinal axis 1247R and a radially relieved section 1248R along a midsection of the passage. Dials 1294L, 1294R are captively held in radially relieved sections 1248L, 1248R, respectively. Bore holes 1298L, 1298R are axially aligned with longitudinal axes 1247L, 1247R, respectively. In the captive positions, dials 1294L, 1294R can rotate in face portion 1240 but remain axially fixed in their respective passages 1245L, 1245R. Dials 1294L, 1294R each have a plurality of ribs 1295 extending around their outer surfaces to make the dials easier to grip and rotate, similar to dial 294.

Threaded posts 1292L, 1292R have external threads 1293L, 1293R, respectively. External threads 1293L, 1293R are respectively configured to mate with internal threads 1299L, 1299R of dials 1294L, 1294R. As such, threaded posts 1292L, 1292R can be advanced into passages 1245L, 1245R and threaded into bore holes 1298L, 1298R of dials 1294L, 1294R. The threaded engagements between threaded posts 1292L, 1292R and dials 1294L, 1294R allow the posts to be axially displaced in passages 1245L, 1245R when the dials are rotated. Passages 1245L, 1245R are sufficiently long to receive most or all of the lengths of their respective posts 1292L, 1292R.

Radially relieved sections 1248L, 1248R each connect to the exterior of face portion 1240 through apertures 1249L, 1249R which open on the front of the face portion and rear of the face portion. A portion of each dial 1294L, 1294R projects through their respective aperture 1249L, 1249R so that the portion is exposed on the exterior of face portion 1240. With this arrangement, a user can rotate each dial 1294L, 1294R with his or her finger and/or thumb. Rotation of dial 1294L will axially displace threaded post 1292L within passage 1245L and move first waveguide 1250L relative to frame 1202. Rotation of dial 1294R will axially displace threaded post 1292R within passage 1245R and move second waveguide 1250R relative to frame 1202.

Dials 1294L, 1294R are oriented with their axes of rotation extending in the horizontal direction. Each dial 1294L, 1294R can be rotated in a first direction by placing a finger or thumb on the dial and moving the finger or thumb in an upward motion relative to frame 1202. Conversely, each dial 1294L, 1294R can be rotated in a second direction opposite the first direction by placing a finger or thumb on the dial and moving the finger or thumb in a downward motion relative to frame 1202.

In some applications, it may be desirable to configure the adjustment couplings 1290L, 1290R so that rotation of each dial 1294L, 1294R in a specific direction moves the corresponding waveguides 1265L, 1265R in the same direction. For example, adjustment couplings 1290L, 1290R can be configured so that rotating each dial 1294L, 1294R in a first direction moves waveguides 1265L, 1265R toward the left sides 1204L, 1206L of first and second sockets 1204, 1206. In addition, adjustment couplings 1290L, 1290R can be configured so that rotating each dial 1294L, 1294R in a second direction moves waveguides 1265L, 1265R toward the right sides 1204R, 1206R of first and second sockets 1204, 1206. To accomplish this, external thread 1293L and external thread 1293R are oriented in the same direction, rather than in a mirror arrangement.

Movement of dials 1294L, 1294R in a first direction of rotation has the effect of moving first and second waveguides 1265L, 1265R toward left sides 1204L, 1206L of sockets 1204, 1206. This direction of movement of first and second waveguides 1265L, 1265R will be referred to as "left" or the "left direction", which is depicted by the arrow in FIG. 13. Conversely, movement of dials 1294L, 1294R in a second direction of rotation has the effect of moving first and second waveguides 1265L, 1265R toward right sides 1204R, 1206R of sockets 1204, 1206. This direction of movement of first and second waveguides 1265L, 1265R will be referred to as "right" or the "right direction", which is depicted by the arrow in FIG. 14.

Eyewear according to the present disclosure can feature conventional or customized components for projecting light images through the lenses. Referring to FIGS. 11 and 15, first housing 1230L contains a first projector 1236L, and second housing 1230R contains a second projector 1236R. First projector 1236L is operable to project light into first waveguide 1250L, and second projector 1236R is operable to project light into second waveguide 1250R.

Light is projected from first and second projectors 1236L, 1236R into first and second waveguides 1250L, 1250R through two pairs of prisms. In particular, light from first projector 1236L is projected through a first prism pair 1253L into first waveguide 1250L, and light from second projector 1236R is projected through a second prism pair 1253R into second waveguide 1250R. First prism pair 1253L includes a first prism 1255L contained in frame 1202 and a second prism 1257L attached to first waveguide 1250L. Similarly, second prism pair 1253R includes a first prism 1255R contained in frame 1202 and a second prism 1257R attached to second waveguide 1250R.

During operation, light from first projector 1236L travels into first prism 1255L and contacts a mirror that reflects the light parallel to first waveguide 1250L. Likewise, light from second projector 1236R travels into first prism 1255R and contacts a mirror that reflects the light parallel to second waveguide 1250R. The light exits first prisms 1255L, 1255R orthogonal to the output surface of each prism, thereby eliminating refraction losses. Light from first prism 1255L enters second prism 1257L, and light from first prism 1255R enters second prism 1257R. The light enters second prisms 1257L, 1257R in a direction orthogonal to the input surface of each prism and bounces off a mirror in each prism. Light exits second prism 1257L and enters first waveguide 1250L at a predetermined angle, and light exits second prism 1257R and enters second waveguide 1250R at a predetermined angle. The light in first waveguide 1250L travels until it reaches first output coupler 1265L, where it exits first lens 1260L. Light in second waveguide 1250R travels until it reaches second output coupler 1265R, where it exits second lens 1260R.

Figure 17:
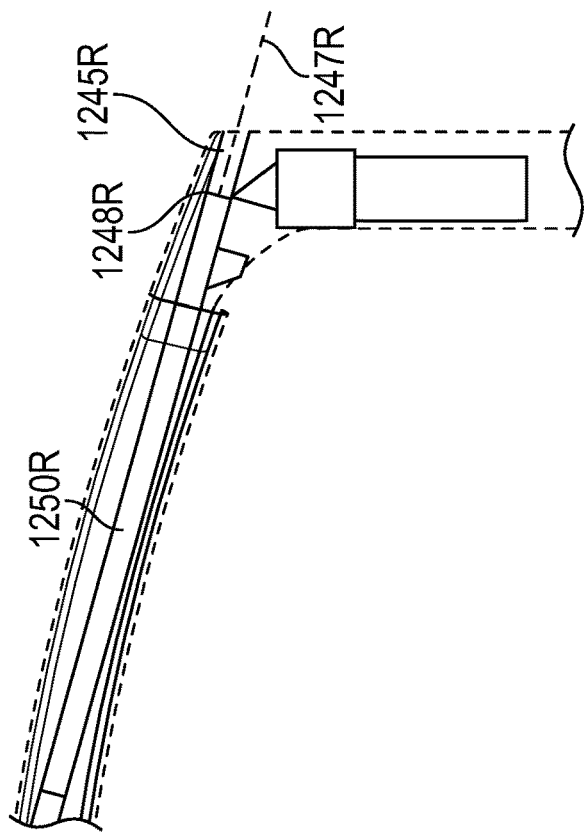
FIG. 17 is a schematic top view of components of the AR eyewear according to FIG. 11, shown in a second operative state.
Figure 16:
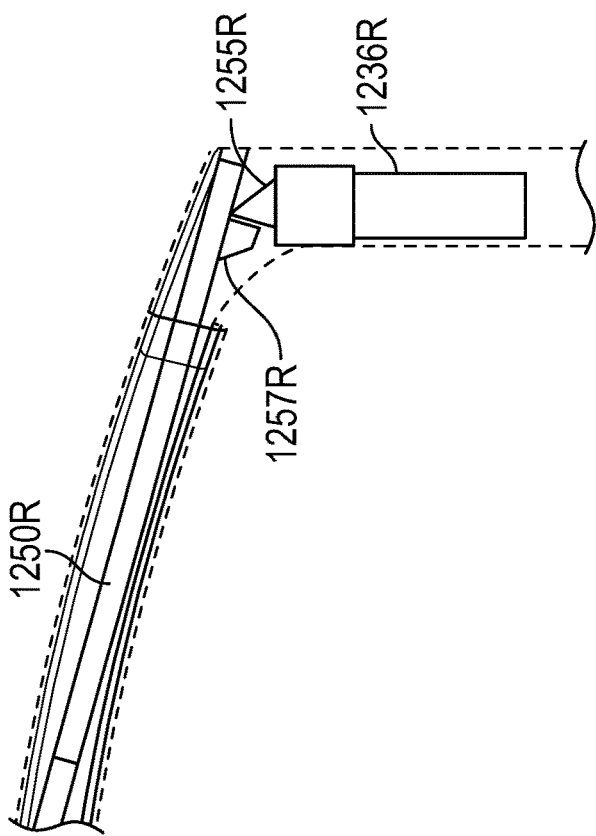
FIG. 16 is a schematic top view of components of the AR eyewear according to FIG. 11, shown in a first operative state.

Second prism 1257L is attached to first waveguide 1250L, and second prism 1257R is attached to second waveguide 1250R. Therefore, adjustment coupling 1290L is operable to move second prism 1257L relative to first prism 1255L during horizontal adjustment of first waveguide 1250L. Similarly, adjustment coupling 1290R is operable to move second prism 1257R relative to first prism 1255R during horizontal adjustment of second waveguide 1250R. FIGS. 16 and 17 illustrate the movable relationship between first prism 1255R and second prism 1257R associated with second waveguide 1250R. In FIG. 16, dial 1294R has been rotated to position second waveguide 1250R in the rightmost position. In this position, first prism 1255R is positioned approximately adjacent to second prism 1257R. In FIG. 17, dial 1294R has been rotated to position second waveguide 1250R in the leftmost position. In this position, second prism 1257R is moved farther away from first prism 1255R, having traveled to the left with second waveguide 1250R. This has the effect of moving second output coupler 1265R and eye box 1270R toward left side 1206L of second socket 1206. Eye box 1270R can be moved from this position to the right by rotating dial 1294R until the eye box 1270R is in an optimized horizontal position.

Eyewear 1200 can be placed on a user's head in the same manner as eyewear 200. For example, a user can place eyewear 1200 on his/her head by placing first temple 1220L over their left ear and placing right temple 1220R over their right ear. The user then lowers first temple 1220L and second temple 1220R onto the left ear and right ear, respectively, until the first and second temples rest on top of each ear behind the helix. Portions of end pieces 1222L, 1222R may also rest on top of the ear and/or extend around the ear behind the helix. Face portion 1240 is lowered onto the user's nose until bottom edge 1240B rests on top of the nose, with first lens 1260L in front of the left eye and second lens 1260R in front of the right eye. In this arrangement, eyewear 1200 is supported in a stable position on the user's left ear, right ear and nose.

Eyewear 1200 is powered on in a conventional manner to activate first and second projectors 1236L, 1236R and produce images in first and second eye boxes 1270L, 1270R. The user's bone structure, facial features, or other physiological or non-physiological factors can initially cause first and second eye boxes 1270L, 1270R to be too far to the left or too far to the right relative to the user's pupils. In such a case, the relative positions of first and second eye boxes 1270L, 1270R can be fine-tuned using adjustable couplings 1290L, 1290R until each eye box is positioned at the optimum horizontal position for the user.

For example, if each eye box 1270L, 1270R is positioned too far to the right relative to the user's eye, the user can fine tune the position of each eye box by rotating dials 1294L, 1294R in a first direction. This action will move first waveguide 1250L and second waveguide 1250R toward the left sides 1204L, 1206L of first and second sockets 1204, 1206, respectively, thereby moving eye boxes 1270L, 1270R to the left. Conversely, if each eye box 1270L, 1270R is positioned too far to the left relative to the user's eye, the user can fine tune the position of each eye box by rotating dials 1294L, 1294R in a second direction opposite the first direction. This action will move first waveguide 1250L and second waveguide 1250R toward the right sides 1204R, 1206R of first and second sockets 1204, 1206, respectively, thereby moving eye boxes 1270L, 1270R to the right. Depending on whether eye boxes 1270L, 1270R are too far left or too far right, the user rotates the dial in the first direction or second direction until the user can see the full images in the eye boxes.

Figure 18:
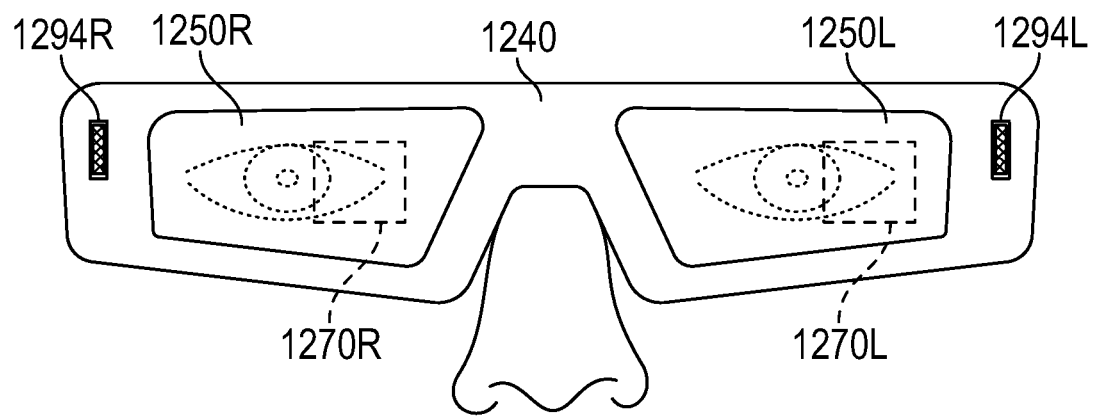
FIG. 18 is a front view of the AR eyewear according to FIG. 11, being worn by a user in a first position prior to adjustment.
Figure 19:
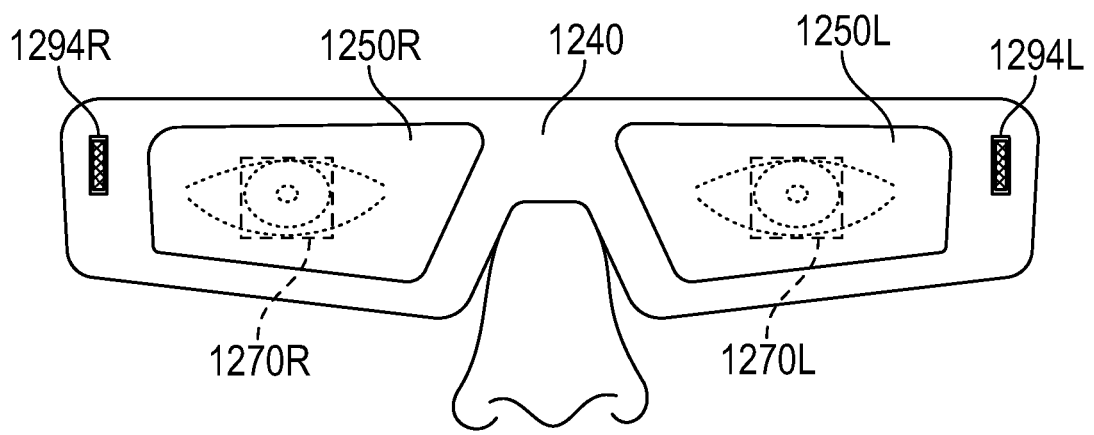
FIG. 19 is a front view of the AR eyewear according to FIG. 11, being worn by a user in a second position after adjustment.

FIGS. 18 and 19 illustrate the relative positions of face portion 1240 and eye boxes 1270L, 1270R before and after adjustment. Some features of eyewear 1200, such as output couplers 1265L, 1265R, are omitted for clarity.

FIG. 18 depicts a scenario in which eyewear 1200 is placed on the user's face without any adjustment. The projectors 1236L, 1236R are powered on to produce images in first and second eye boxes 1270L, 1270R. In this scenario, first and second eye boxes 1270L, 1270R are too far to the left relative to the user's pupils. Therefore, the user will not be able to see complete images. To correct this condition, the user can rotate dial 1294L to move first waveguide 1250L to the right until eye box 1270L is aligned with the user's left eye. In addition, the user can rotate dial 1294R to move second waveguide 1250R to the right until eye box 1270R is aligned with the user's right eye. FIG. 19 shows the same eyewear 1200 on the same user after first and second waveguides 1250L, 1250R have been adjusted. As can be seen, eye boxes 1270L, 1270R have both moved to the right relative to the user's eyes. In this adjusted position, first and second eye boxes 1270L, 1270R are horizontally centered in optimized positions in front of the user's pupils so that the user can see the full image in each eye box.

As with previous embodiments, the thread pitches of external threads 1293L, 1293R and internal threads 1299L, 1299R are preferably small. In this arrangement, each 360 degree revolution of dials 1294L, 1294R only moves first and second waveguides 1270L, 1270R a small distance left or right. The thread pitch can be in the range of 0.3 mm-1.0 mm, for example. Other thread pitches can also be used with suitable results. A small thread pitch permits very fine adjustment of the horizontal position of eye boxes, and also prevents significant changes in horizontal position when dials 1294L, 1294R are inadvertently bumped or touched, such as when the user takes the eyewear off or when the eyewear is being handled.

The threaded engagement between frame 1202 and first and second waveguides 1250L, 1250R has the advantage of providing continual horizontal adjustment of first and second eye boxes 1270L, 1270R. First and second eye boxes 1270L, 1270R can be horizontally adjusted through an infinite number of horizontal positions, and can be adjusted independently of one another, so that each eye box can be adjusted by a different amount or the same amount. This ability to adjust the horizontal position of each eye box 1270L, 1270R allows each user to achieve a customized fit that provides optimized horizontal positioning of the eye boxes. As noted above, the ability to optimize the horizontal position of eye boxes 1270L, 1270R avoids the need to design and manufacture multiple different frame sizes. The ability to optimize the horizontal position of eye boxes 1270L, 1270R also avoids the need to provide large eye boxes to accommodate different users. In fact, the horizontal dimension of eye boxes and output couplers can be reduced because the ability to fine tune the horizontal positions of eye boxes makes it possible to align a much narrower eye box to any eye. It has been found than an output coupler that is 14 mm wide×9 mm wide can be reduced directly proportional to horizontal adjustment provided by this mechanism. For example, if the mechanism provided 2 mm of horizontal travel, then the output coupler could be reduced to 14 mm×7 mm.

Figure 20:
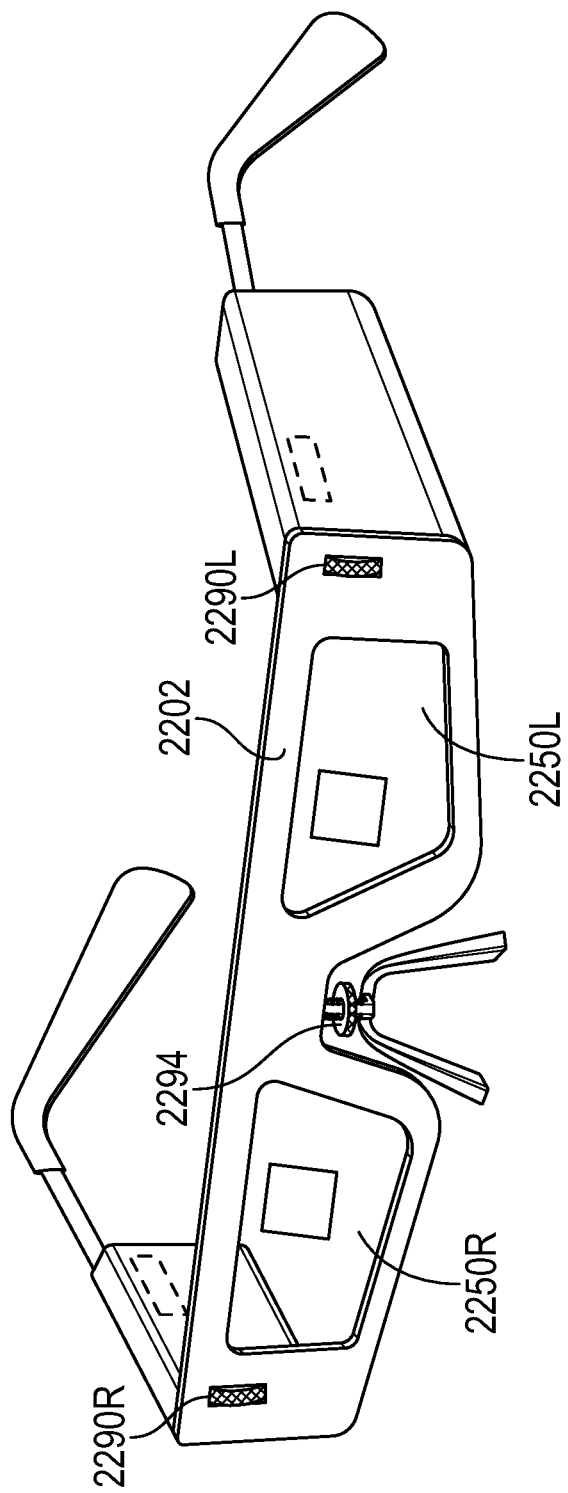
FIG. 20 is a perspective view of AR eyewear according to another example of the present disclosure.

In certain applications, it can be desirable to provide mechanisms that adjust both the vertical and horizontal positions of eye boxes. Therefore, eyewear according to the present disclosure can include vertical and horizontal adjustment mechanisms in combination. For example, eyewear according to the present disclosure can include both the adjustment coupling 290 shown on eyewear 200, and adjustment couplings 1290L, 1290R shown on eyewear 1200. FIG. 20 shows one example of eyewear 2200 that utilizes a vertical adjustment coupling 2290 analogous to adjustment coupling 290, and horizontal adjustment couplings 2290L, 2290R that are analogous to adjustment couplings 1290L, 1290R. Adjustment couplings 2290, 2290L, 2290R operate independently of one another. Therefore, the trio of adjustment couplings 2290, 2290L, 2290R can cooperate together to allow the user to optimize both the vertical and horizontal positions of each eye box. Eyewear 2200 has a frame 2202 supporting first and second waveguides 2250L, 2250R which are configured identically to waveguides 1250L, 1250R. Other components of eyewear 2200 are identical to the components previously described in eyewear 200 and 1200, and therefore will not be described.

Figure 21:
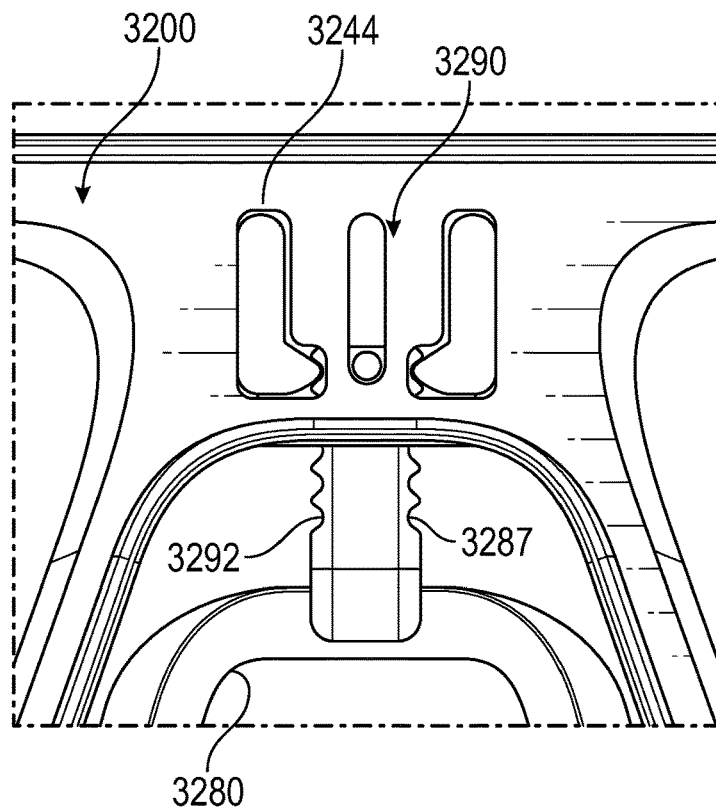
FIG. 21 is a truncated rear elevation view of AR eyewear according to yet another example of the present disclosure, wherein the nose rest is shown in a maximally lowered position.
Figure 22:
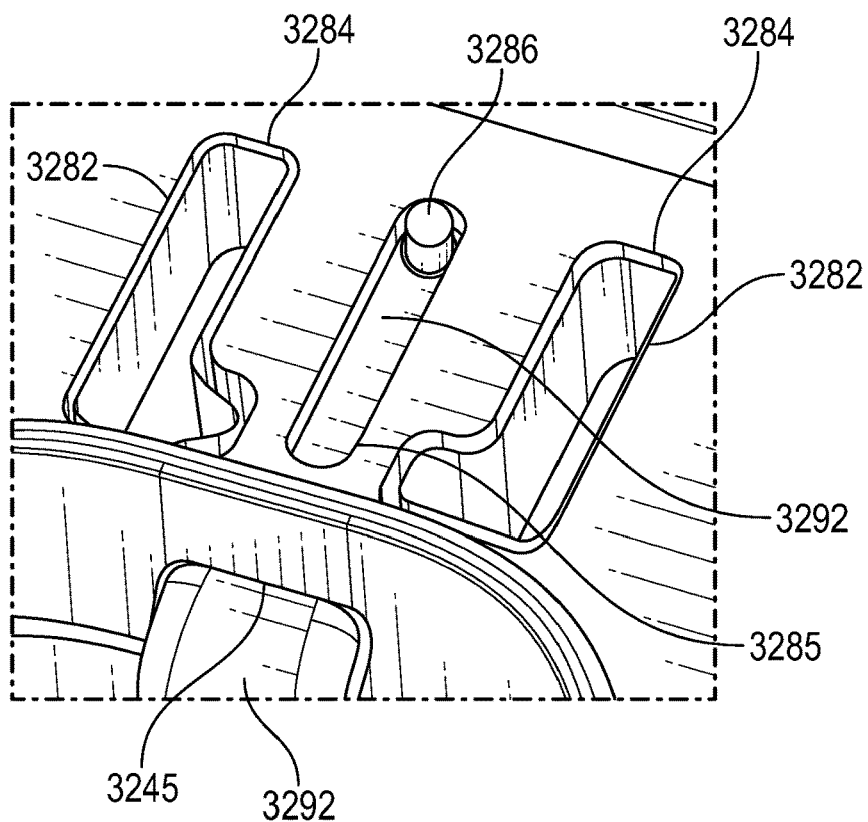
FIG. 22 is a truncated isometric view of the AR eyewear of FIG. 21, wherein the nose rest is shown in a maximally raised position.
Figure 23:
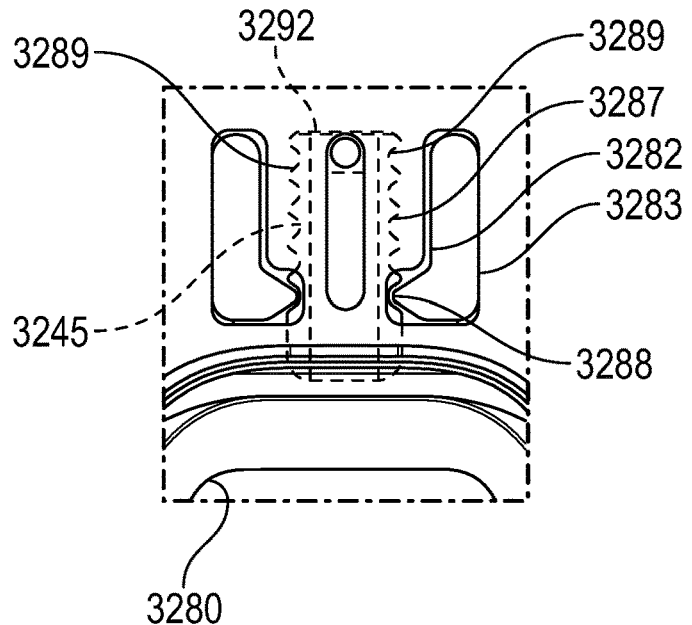
FIG. 23 is a truncated and magnified view of the AR eyewear of FIG. 21, wherein internal features of the AR eyewear are shown in hidden lines.

FIGS. 21-23 depict an example of eyewear 3200 that utilizes a vertical adjustment coupling 3290 analogous to vertical adjustment coupling 290. Vertical adjustment coupling 3290 includes a multi-part assembly featuring a ribbed post 3292 extending from nose rest 3280 that interacts with two opposing springs 3282 that are positioned within the bridge 3244 of the eyewear 3200. Interaction between the post 3292 and the springs 3282 controls vertical adjustment of the nose rest 3280 with respect to the bridge 3244.

Bridge 3244 of the eyewear 3200 defines an interior rectangular passage 3245 for receiving the ribbed post 3292 and the two opposing springs 3282. Cutouts 3284 are formed on the rear side of the bridge 3244, and each cutout 3284 intersects the rectangular passage 3245. Each cutout 3284 is shaped and sized to receive one of the springs 3282. A vertically extending elongated slot 3285 is also formed on the rear side of the bridge 3244, and the slot 3285 intersects the passage 3245. The slot 3285 is sized to accommodate vertical travel of a set screw or pin 3286 that is fixed to the top end of the ribbed post 3292. The pin 3286, along with the springs 3282, constrain vertical translation of the nose rest 3280 within the passage 3245 of the bridge 3244. The pin 3286 also prevents the nose rest 3280 from becoming detached from the eyewear 3200.

Each longitudinally extending side of the rectangular ribbed post 3292 includes a series of six semi-circular recesses 3287. The recesses 3287 form an undulating or ribbed surface 3289 along the sides of the post 3292. Each ribbed surface 3289 is configured to interact with the bulbous end 3288 of a respective spring 3282 to control vertical translation of the nose rest 3280 relative to the bridge 3244 of the eyewear 3200.

The diameter of the bulbous end 3288 is substantially equal to the diameter of each recess 3287, such that the bulbous end 3288 can be accommodated within each recess 3287. The bulbous end 3288 is configured to flex during operation, whereas the side 3283 of each spring 3282 may (or may not) be fixed to an interior surface of the bridge 3244.

In operation, a user can manually adjust the vertical position of the nose rest 3280 by either pushing or pulling on the nose rest 3280. As the user adjusts the position of the nose rest 3280, the pin 3286 travels within the elongated slot 3285. At the same time, the bulbous ends 3288 of the springs 3282 flex inwardly and then outwardly as the ribbed surfaces 3289 of the post 3292 travel vertically within the passage 3245. The post 3292 of the nose rest 3280 can travel between the maximally lowered position of FIG. 21 and the maximally raised position of FIGS. 22 and 23. The post 3292 can be maintained in six different vertical positions corresponding to the number of recesses 3287 on each side of the post 3292. Adjacent recesses 3287 are separated by 1 mm, for example, such that the total vertical travel of the nose rest 3280 is 5 mm, for example.

Figure 24:
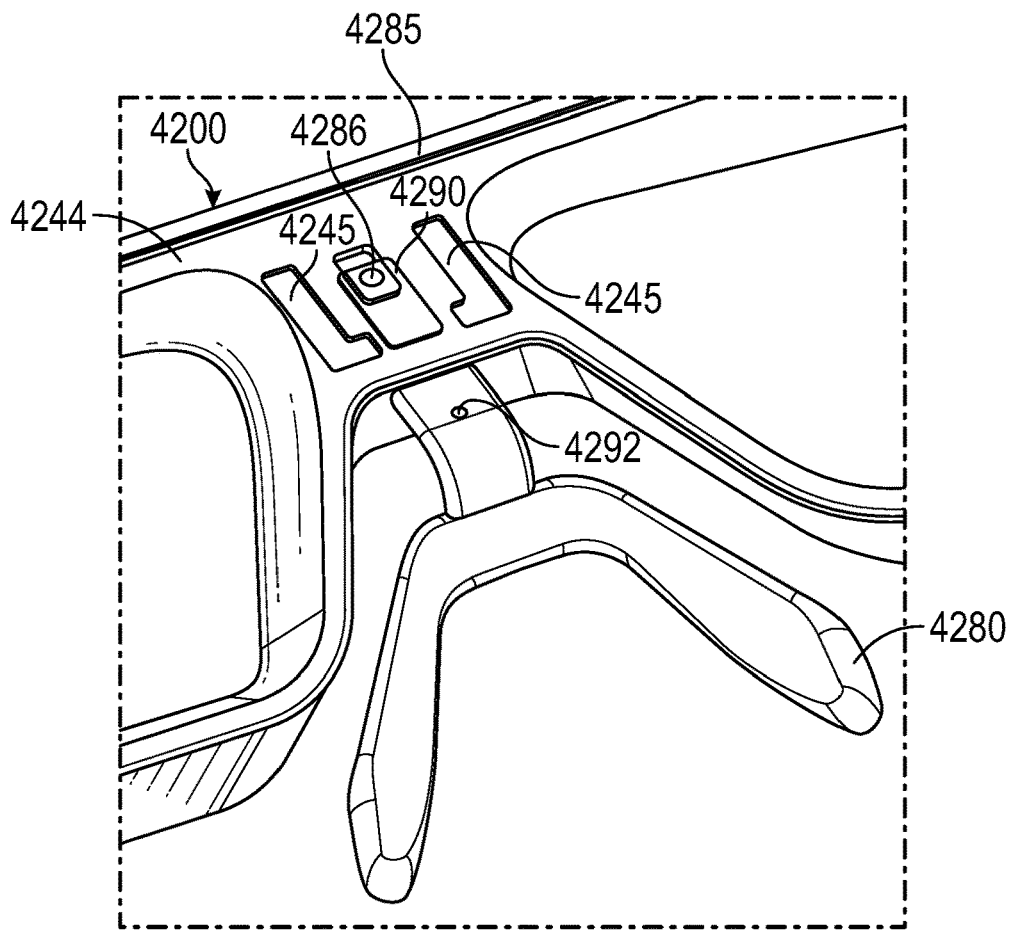
FIG. 24 is a truncated rear elevation view of AR eyewear according to still another example of the present disclosure.
Figure 25B:
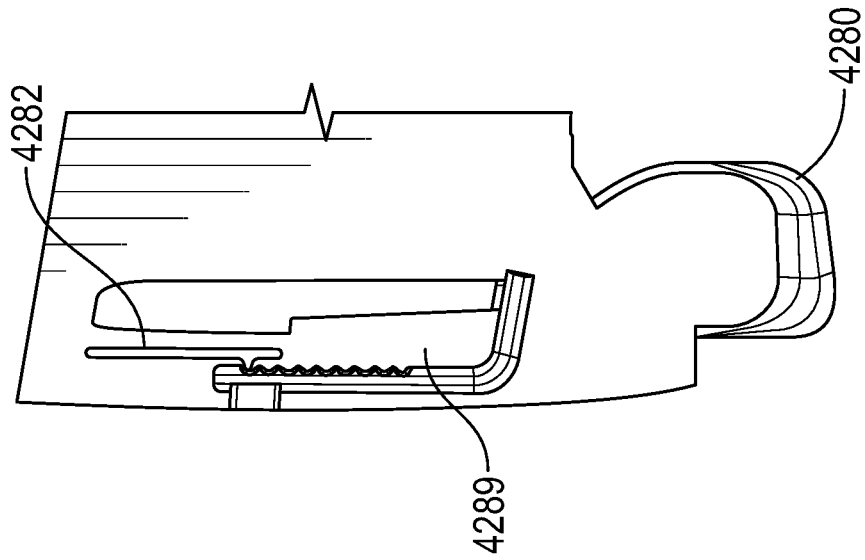
FIG. 25B is another cross-sectional view of the AR eyewear of FIG. 24, wherein the nose rest is shown in a maximally lowered position.
Figure 25A:
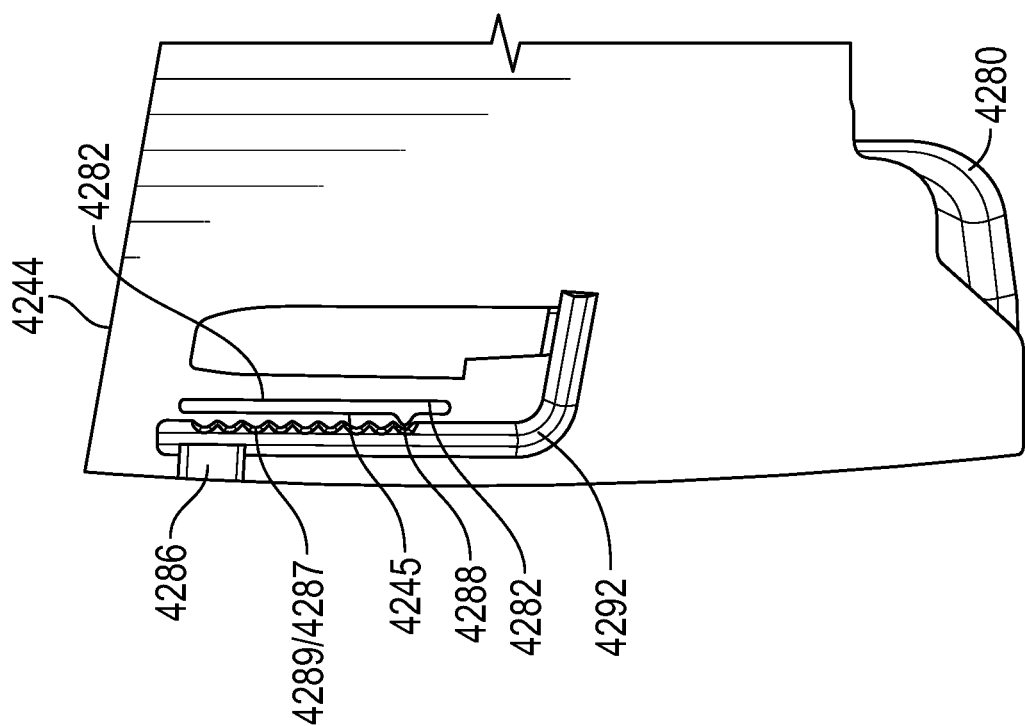
FIG. 25A is a cross-sectional view of the AR eyewear of FIG. 24, wherein the nose rest is shown in a maximally raised position.

FIGS. 24-25B depict an example of eyewear 4200 that utilizes a vertical adjustment coupling 4290 analogous to vertical adjustment coupling 3290. Vertical adjustment coupling 4290 includes a multi part assembly featuring a ribbed post 4292 extending from nose rest 4280 that interacts with a detent spring 4282 that is positioned within the bridge 4244 of the eyewear 4200. Interaction between the post 4292 and the spring 4282 controls vertical adjustment of the nose rest 4280.

Bridge 4244 of the eyewear 4200 defines a rectangular passage 4245 for receiving the ribbed post 4292 and the spring 4282. A vertically extending elongated slot 4285 is formed on the rear side of the bridge 4244, and the slot 4285 intersects the passage 4245. The slot 4285 is sized to accommodate vertical travel of a set screw, pin or protrusion 4286 that is fixed to the top end of the ribbed post 4292. The protrusion 4286, along with the spring 4282, constrains vertical translation of the nose rest 4280 within the rectangular passage 4245 of the bridge 4244. The pin 4286 also prevents the nose rest 4280 from becoming detached from the eyewear 4200.

The rear facing surface of the rectangular ribbed post 4292 includes a series of nine semi-circular recesses 4287. The recesses 4287 form an undulating or ribbed surface 4289 along the rear surface of the post 4292. The ribbed surface 4289 is configured to interact with the bulbous semi-circular end 4288 of the spring 4282 to control vertical translation of the nose rest 4280 relative to the bridge 4244 of the eyewear 4200. The diameter of the bulbous end 4288 is substantially equal to the diameter of each recess 4287, such that the bulbous end 4288 can be accommodated within each recess 4287. The top end of the spring 4282 may be fixed to the bridge 4244, while the bottom end of the spring 4282 defining the bulbous end 4288 is configured to move and flex.

In operation, a user can manually adjust the vertical position of the nose rest 4280 by either pushing or pulling on the nose rest 4280. As the user adjusts the position of the nose rest 4280, the pin 4286 travels within the elongated slot 4285. At the same time, the bulbous end 4288 of the spring 4282 flexes inwardly and then outwardly as the ribbed surface 4289 of the post 4292 travels within the passage 4245. The post 4292 of the nose rest 4280 can travel between the maximally lowered position of FIG. 25B and the maximally raised position of FIG. 25A. The post 4292 can be maintained in nine different vertical positions corresponding to the number of recesses 4287 on the post 4292. Adjacent recesses 4287 are separated by 1 mm, for example, such that the total vertical travel of the nose rest 4280 is 8 mm, for example.

It is understood that various modifications can be made to the examples described in this disclosure, and that the subject matter in this disclosure can be implemented in various forms. For example, adjustable couplings according to the present disclosure can be utilized in different types of AR eyewear and for different applications. An adjustable coupling according to the present disclosure can be utilized with a frame containing only a single lens over one of the user's eyes, for example. Alternatively, the frame can have two separate lenses, where only one of the lenses serves as a waveguide that projects an image toward a user's eye.

Furthermore, it will be understood that eyewear and frame assemblies according to the present disclosure can be supported on the head and face in different ways, and need not be limited to eyewear resting on the user's ears and/or nose. Eyewear and frame assemblies can be supported on the head and face in other ways, while still having one or more adjustable couplings that operate under the same principles described in this disclosure to adjust the vertical and horizontal positions of eye boxes relative to the user's pupils.

The following claims are intended to encompass any and all such modifications and variations within the present disclosure.

What is claimed:

1. An adjustable frame assembly for augmented reality eyewear, the adjustable frame assembly comprising:
   A. a face portion supporting a first lens and a second lens, the face portion defining at least one passage in the face portion that has a longitudinal axis, the face portion further comprising at least one aperture on an exterior of the face portion that connects with the at least one passage;
   B. a support rest for supporting the face portion on a user; and
   C. at least one coupling for adjusting a position of at least one of the first lens and the second lens relative to the support rest, the at least one coupling comprising:
      i. a first coupling element comprising a first engagement surface, the first coupling element embedded in the face portion and projecting into the at least one aperture; and
      ii. a second coupling element comprising a second engagement surface that is mated with and movably engages the first engagement surface on the first coupling element,
   the first coupling element being movable relative to the face portion in response to a force applied to the first coupling element to displace the second coupling element and move said at least one of the first lens and the second lens relative to the support rest.

2. The adjustable frame assembly according to claim 1, wherein the first coupling element comprises a first threaded element and the second coupling element comprises a second threaded element that mates with the first threaded element.

3. The adjustable frame assembly according to claim 2, wherein the first threaded element comprises an internal thread in the face portion, and wherein the second threaded element comprises a threaded post with an external thread that extends around a circumference of the threaded post.

4. The adjustable frame assembly according to claim 3, wherein the first threaded element comprises a dial embedded in the face portion, the dial defining a bore, and the internal thread extending inside the bore.

5. The adjustable frame assembly according to claim 4, wherein the threaded post is attached to the support rest.

6. The adjustable frame assembly according to claim 5, wherein the dial is rotatable relative to the face portion to axially displace the support rest relative to the face portion.

7. The adjustable frame assembly according to claim 4, wherein the threaded post extends from one of the first lens and the second lens.

8. The adjustable frame assembly according to claim 7, wherein the dial is rotatable relative to the face portion to axially displace said one of the first lens and the second lens relative to the face portion.

9. The adjustable frame assembly according to claim 1, wherein the face portion comprises a first rim for supporting the first lens, a second rim for supporting the second lens, and a bridge that interconnects the first rim and the second rim, and wherein the at least one coupling movably connects the support rest to the bridge.

10. The adjustable frame assembly according to claim 1, wherein the first lens comprises a first input coupler and a first output coupler, and the second lens comprises a second input coupler and a second output coupler.

11. The adjustable frame assembly according to claim 10, further comprising a first projector operable to project light containing a first image into the first lens and a second projector operable to project light containing a second image into the second lens.

12. The adjustable frame assembly according to claim 11, wherein the first output coupler is operable to produce the first image in a first eye box and the second output coupler is operable to produce the second image in a second eye box.

13. The adjustable frame assembly according to claim 12, wherein the at least one coupling is operable to move the first eye box and the second eye box in unison and in a same direction relative to the support rest.

14. The adjustable frame assembly according to claim 12, wherein the at least one coupling is operable in a first direction to move the first eye box and the second eye box in a downward direction relative to the support rest, and operable in a second direction to move the first eye box and the second eye box in an upward direction relative to the support rest.

15. The adjustable frame assembly according to claim 1, wherein the at least one coupling comprises a ratcheted coupling.

16. The adjustable frame assembly according to claim 1, wherein the at least one coupling comprises a first coupling and a second coupling, and the at least one passage comprises a first passage and a second passage.

17. The adjustable frame assembly according to claim 16, wherein a threaded post of the first coupling extends from the first lens and the threaded post of the second coupling extends from the second lens.

18. The adjustable frame assembly according to claim 17, wherein the at least one coupling further comprises a third coupling, and the at least one passage further comprises a third passage.

19. An adjustable frame assembly for augmented reality eyewear, the adjustable frame assembly comprising:
   A. a face portion supporting a first lens and a second lens, the face portion defining at least one passage in the face portion that has a longitudinal axis, the face portion further comprising at least one aperture on an exterior of the face portion that connects with the at least one passage;
   B. a support rest for supporting the face portion on a user; and
   C. at least one coupling for adjusting a position of at least one of the first lens and the second lens relative to the support rest, the at least one coupling comprising:
      i. a first coupling element comprising a first engagement surface, the first coupling element embedded in the face portion and projecting through the at least one aperture and into said at least one passage; and
      ii. a second coupling element extending within said at least one passage and comprising a second engagement surface that is mated with and movably engages the first engagement surface on the first coupling element,
   the first coupling element being in direct contact with the second coupling element, and
   the first coupling element being movable relative to the face portion in response to a force applied to the first coupling element to displace the second coupling element and move said at least one of the first lens and the second lens relative to the support rest.

20. An adjustable frame assembly for augmented reality eyewear, the adjustable frame assembly comprising:

A. a face portion supporting a first lens and a second lens, the face portion defining at least one passage in the face portion that has a longitudinal axis, the face portion further comprising at least one aperture on an exterior of the face portion that connects with the at least one passage;

B. a support rest for supporting the face portion on a user; and

C. at least one coupling for adjusting a position of at least one of the first lens and the second lens relative to the support rest, the at least one coupling comprising:
  i. a first coupling element defining a bore hole and comprising a first threaded engagement surface inside the bore hole, the first coupling element embedded in the face portion and projecting into the at least one aperture; and
  ii a second coupling element comprising a second threaded engagement surface that extends into the bore hole, the second threaded engagement surface directly mating with the first threaded engagement surface inside the bore hole and movably engaging the first threaded engagement surface on the first coupling element, the first coupling element being movable relative to the face portion in response to a force applied to the first coupling element to linearly displace the second coupling element through the bore hole of the first coupling element and move said at least one of the first lens and the second lens relative to the support rest.

* * * * *